United States Patent [19]
Culp

[11] Patent Number: 4,758,906
[45] Date of Patent: Jul. 19, 1988

[54] BLOCK PATTERN DETECTION CIRCUITRY

[75] Inventor: Bradfred W. Culp, Greeley, Colo.

[73] Assignee: Hewlett-Packard Company, Palo Alto, Calif.

[21] Appl. No.: 933,704

[22] Filed: Nov. 21, 1986

[51] Int. Cl.⁴ ............................................. G11B 20/12
[52] U.S. Cl. .......................................... 360/39; 360/50
[58] Field of Search ...................... 360/39, 48, 49, 50; 375/112, 116

[56]  References Cited
U.S. PATENT DOCUMENTS

| | | | |
|---|---|---|---|
| 3,588,855 | 6/1971 | Scully | 360/50 |
| 3,863,265 | 1/1975 | Klumpp | 360/48 |
| 3,994,014 | 11/1976 | Burgiss | 360/50 |
| 4,176,380 | 11/1979 | Koski et al. | 360/50 |
| 4,321,632 | 3/1982 | Leis et al. | 360/49 |
| 4,356,566 | 10/1982 | Wada et al. | 375/116 |
| 4,618,898 | 10/1986 | Young et al. | 360/39 |

Primary Examiner—Raymond F. Cardillo
Assistant Examiner—Surinder Sachar
Attorney, Agent, or Firm—Jeffery B. Fromm

[57]  ABSTRACT

Block pattern detection circuitry for the read subsystem of a streaming tape drive system comprises a state machine, a pattern decoder, a tape mark detector, a block/gap filter, a block/gap meter, a verify count section, and a block read/verify section. The incorporation of a hardware state machine within the block detect circuitry permits the application of historical detect data in the interpretation of present detect data. This provides more certain pattern recognitions. Also, state data is fed back to the block/gap filter allowing precise block boundary triggers which are used by position capture circuitry and the drive controller to effect more precise re-try positioning. The use of the block/gap filter increases the detect circuitry's immunity to noise. The advantage is enhanced where the block/gap filter uses stochastic thresholding, which is also advantageously employed by the tape mark detector.

9 Claims, 19 Drawing Sheets

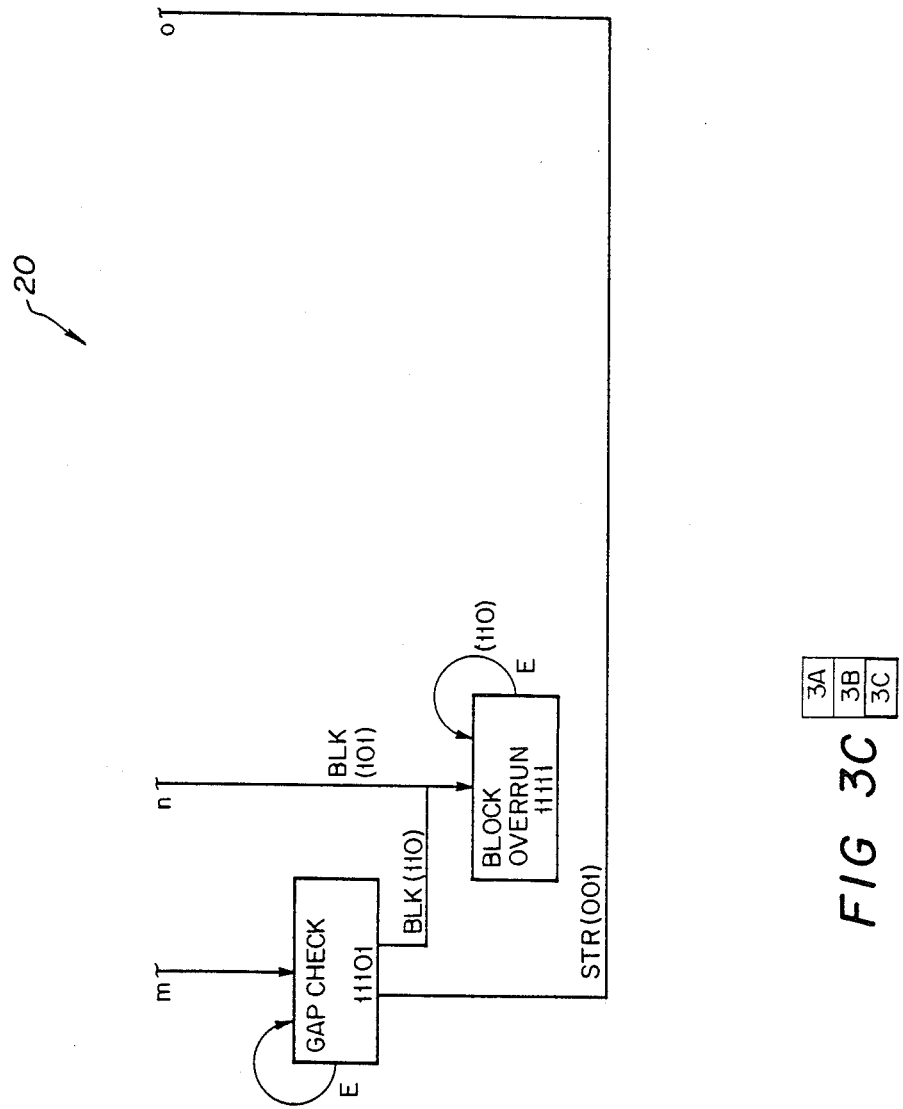

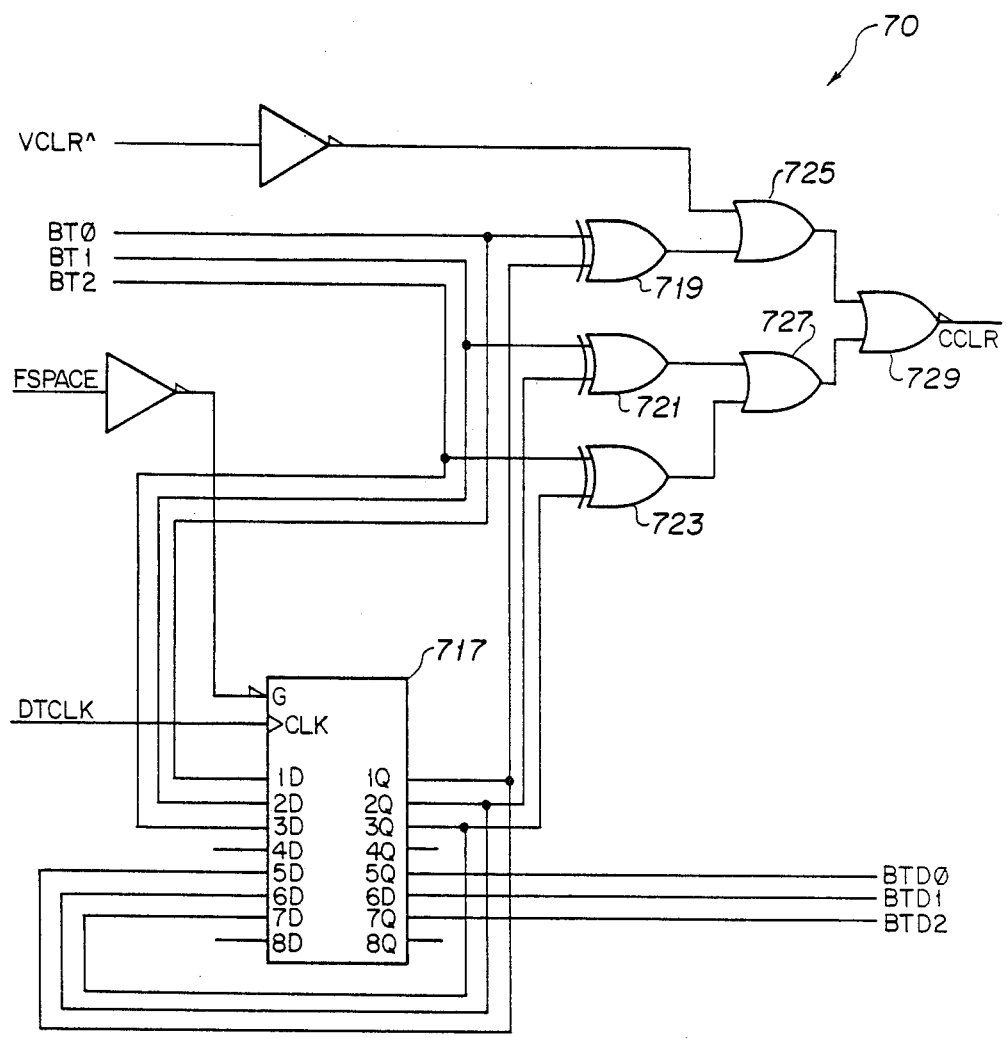

BLOCK PATTERN DETECTION CIRCUITRY

BACKGROUND OF THE INVENTION

The present invention relates to block pattern detection circuitry, and, more particularly, to such circuitry providing for improved error handling in a streaming tape drive system.

Streaming tape drives are bulk data storage and retrieval devices which are used, for example, in conjunction with a host computer. Basic performance criterion include the amount of information that can be stored on a tape medium and the rate at which information can be written onto and read from the tape. In general, performance is improved by increasing the density, i.e., the amount of information stored per unit length of tape, and the speed at which the tape travels across read and write heads of the streaming tape drive system.

However, increases in speed and density constrain the tolerances available to the tape drive system and the tape itself. Errors become more frequent as the tolerance constraints become more difficult to meet and maintain. Generally, these errors occur as bits of information as read turn out to be different than they were intended to have been written. Since the value of information is greatly diminished when its integrity is uncertain, error handling ability emerges as an additional important performance specification for high-performance streaming tape drive systems.

As a prelude to a discussion on error handling, consideration is given to the form in which information is stored on the tape media. Basically, information is stored as magnetic flux levels in a magnetic media. To achieve the desired higher speeds and densities, the information can be stored in parallel tracks. For example, each bit of a nine-bit "word" can be assigned to a respective track of a nine-track tape so that all bits of the "word" are simultaneously available during retrieval. The tape is then configured as a series of nine-bit words.

Since the "user" data supplied and requested by the host computer is generally unintelligible to the streaming tape drive system, little error handling could be performed if only user data were stored on the tape. Therefore, a streaming tape drive system typically adds information intelligible to it, providing the capability of evaluating the integrity of the read and write operations.

For example, the user data can be made more manageable by formatting it into blocks separated by "gaps". The user data generally includes data proper, which is recorded within data blocks, and file end markers, which are recorded as tape marks. Since formatting conventions can vary, a flexible tape drive system can apply identification marks during write operations identifying which formatting conventions, e.g., phase encoded (PE ID), double-density phase encoded (DPE ID), group code recorded (GCR ID), apply to a given tape.

Each of these standard formats includes a scheme for encoding user data which permits errors to be detected and, if possible, corrected. For example, a nine-track tape drive permits the system to add an error-detection parity bit to each eight-bit word of user data. The more complex group code recording rearranges sets of seven user bytes into sets of ten bytes with error correction codes, with additional bytes added for residuals and cyclical redundancy check bytes.

Furthermore, user end-of-file marks, which can be a single character, are converted to tape marks which comprise a predetermined pattern repeated for many consecutive flux spaces. For example, in GCR format, a tape mark consists of activity in tracks 1, 2, 4, 5, 7 and 8 and erasure in tracks 3, 6 and 9, this pattern being repeated for 250 to 400 flux spaces. This conversion makes file boundaries far less vulnerable to noise than would be the case if the file boundary character were simply recorded as a one character record.

According to the format selected, preambles, postambles, and embedded marks can be added to identify block boundaries and permit synchronization across parallel data channels. For example, a preamble to a block of user data can be used by de-skew circuitry to ensure that the channels of digital data corresponding to the tracks of flux data are synchronized with respect to each other so that the individual bits of a word are processed as such, and not as bits of preceding or succeeding words.

Other types of system data can be written along with the foregoing. For example, automatic read amplification (ARA) bursts can be used to automatically set gain levels within the tape drive system. Such ARA bursts can be identified as such by ARA ID marks.

As an illustration of how system data can enhance error handling, once the format is determined from an ID mark, the error codes can be used to flag errors in otherwise unintelligible user data. Additionally, the preambles to data blocks can be used for synchronization, as indicated above. When a gap is detected following a block before a postamble is detected, this can indicate that a full-width drop-out has occurred within the data block. Generally, the included system data generates a set of acceptable recognizable patterns, deviations from which can be used to flag errors.

The system data is applied by the tape drive system during write operations by a write formatter section of a write subsystem. The system data is then checked by the read subsystem during a read operation, or during a write operation in verify mode. In either case, it is the read subsystem which performs the checking; the read head can be positioned upstream of the write head so that information is read after it is written to verify that the system data conforms to the conventions being implemented.

Of course, system data is not immune to errors, so it is important that the tape drive system be able to distinguish user data and system data, even when errors are present. However, while system data can include so much noise as to be unidentifiable, it is still distinguishable from user data by the absence of preambles and postambles.

Once an error is detected, a strategy for addressing the error must be implemented, usually in conjunction with a drive controller which controls the transfer of the tape in response to information from the read subsystem and other sources. Viable options include: correcting the error in-stream, attempting a correction by re-writing or re-reading the pertinent portion of the tape, and passing the defective data with an error flag.

During write-with-verify operations, re-writing is usually implemented even for easily correctable errors. A second error can render a correctable one-bit error uncorrectable. Therefore, correctable errors should be corrected while the original user data is available to build in tolerance for subsequent errors.

During read operations, in-stream correction is preferred where possible because it has minimal impact on the speed of operation. Errors that cannot be corrected in-stream generally result in re-tries, which are relatively time consuming. If the error remains uncorrected despite re-tries, the error can be flagged to warn the user or to initiate a shut-down or other "drastic" error procedure according to the strategy implemented.

Of course, when a re-try is necessitated, correction is not guaranteed. Re-reading cannot correct severe errors due to damaged media, for example. However, there are other problems inherent in the re-try operation itself. In order to re-try a portion of the tape, a streaming tape drive must correctly position itself so that just after it re-starts and regains operating speed it is just in front of the portion to be retried. Mis-positioning can be wasteful in that portions of tape not needing a re-try can be wastefully re-read. More seriously, positioning errors can confuse the system into treating one block as another, compounding the original error.

Much of the error-handling responsibility falls on the read subsystem which detects and identifies, system data, user data and gaps. A read system can include, by way of example, analog circuitry associated with the read head, analog-to-digital conversion means, de-skew circuitry for synchronizing data streams arranged in parallel tracks on the tape, block detect circuitry, and read/format circuitry.

Of these sections of the read subsystem, the block detect circuitry which identifies, locates and verifies data block types and inter-block gaps, is central to a tape drive system's error handling. For example, a "drop-out" within a block of data can cause a gap to be erroneously detected. Conversely, noise or a "drop-in" can cause a block to be erroneously detected within a gap. Likewise, data blocks, tape IDs and marks can be confused with each other, or rendered incomprehensible to the system. Such errors generally require re-tries which significantly impair system throughput, or may result in an unrecoverable read error.

Once it is determined that a re-try is required, the drive controller subsystem polls various sections of the read subsystem to determine the location of the portions to be re-tried. Given the high speed and flux densities of state-of-the-art systems, the delays involved in determining positions after the drive controller acknowledges an error detection would not permit the precision in positioning required for re-tries.

Accordingly, the drive controller polls the read subsystem for tape positions during routine events such as the occurrence of a gap-to-block boundary. However, even with this tactic, positioning errors occur due to the delays in acknowledgement of boundary detections by the drive controller, which generally is performing multiple tasks at once.

Thus, what is needed is block detect circuitry providing for improved error handling by a streaming tape drive system. This block detect circuitry should provide more positive identification of block types to minimize unnecessary re-tries, and decrease the likelihood of an unrecoverable read error. Further, the block detect circuitry should provide block delimiter signals to provide more precise positioning when re-tries are required.

SUMMARY OF THE INVENTION

Block detect circuitry for a streaming tape drive system includes a pattern decoder, a thresholding means, and a state machine. The pattern decoder is designed to distinguish instantaneous data patterns in a data stream of parallel synchronized data channels. Successions of decoded patterns are analyzed by the thresholding means to provide pattern determinations. The detect state machine progresses through a network of states in response to received control signals including thresholded pattern detections. These components cooperate to provide precise determinations of block boundary positions and block types.

The state machine provides outputs reflecting the current state of the state machine. These outputs reflect historical pattern data which can be used to effect more precise determinations as to the presence and types of blocks by favoring more probable sequences over less probable sequences. This principle can be extended to suppress determinations of a pattern for durations in which that pattern cannot occur.

In particular, the states of a state machine can include states assigned to two sets. One set can represent states corresponding to the determination that a pattern of a first type is detected, and the other set can represent states corresponding to a determination that a pattern of a second type is detected. The state machine output can be used to suppress transitions of a qualified thresholded pattern detect signal while the state machine is in a state within the first set. In the meantime, the last transition of the qualified signal can be used to trigger a position capture corresponding to the boundary between the first and second pattern.

This approach can be extended to provide multiple pattern type transition signals. For example, gap-to-block and block-to-gap boundaries can be signaled. These signals can be used, for example, to initiate position captures that a drive controller can access to provide precise positioning during re-tries.

More specifically, the state machine can include first set of states corresponding to a readiness to detect a block, a second set of states corresponding to a determination that a block is present, and a third set of states corresponding to a determination that block has just past. The output of the state machine can then be used to suppress a qualified thresholded signal so that no transitions occur while the state machine is in either the second or third set of states, during which a detection of a block can be presumed erroneous. Thus, the qualified thresholded signal can be used to edge trigger a position capture representing a gap-to-block boundary.

In addition, a second qualified thresholded signal can be suppressed only during the third set of states to trigger position captures of block-to-gap boundaries. Thus, the front and back boundaries of each block can be precisely determined to provide for accurate positioning during re-tries.

In one realization of the present invention, the thresholding function is performed by four sections of the block detect circuitry: (1) a block/gap filter dedicated to block versus gap detections; (2) a block/gap meter for measuring the length of a current block or gap; (3) a tape mark detector dedicated to tape mark detection; and (4) a verify counter for encoding block lengths for use by a block read/verify section in making final determinations as to block type and assigning confidence levels to these determinations. In this realization, the block read/verify section can have access to state machine outputs so that block-types can be determined using the historical output of the state machine.

All four of the thresholding sections can be implemented using standard counters. Preferably, some stochastic sophistication is implemented in the block/gap filter and the tape mark detector to render these sections and those that receive their outputs less vulnerable to noise.

Stochastic thresholding takes advantage of redundancy and standardized minimum lengths for certain patterns. A very short pattern of activity between two relatively long patterns of inactivity should be interpreted as noise. A bi-directional counter would be counting down until the noise is detected, then count up for a short distance, but then return to the downward count. The net effect is that the noise is filtered out of the gap.

In this vein, the block/gap filter can incorporate a bi-directional "up/down" counter. This counter can be used to count up during block detections and to count down during gap detections. A "block" would be indicated at the section output when an upper threshold is attained, and a "gap" would be indicated whenever the counting down reaches a lower threshold.

The advantage of this stochastic thresholding is that small drop-outs in a block and small drop-ins in a gap are less likely to longer impair block/gap determinations. In the more conventional approach, using only a uni-directional counter for consecutive spaces, a few "well-spaced" drop-ins could prevent a gap from being recognized as such.

The tape mark detector also is concerned with redundant patterns of minimum duration, and so advantageously can incorporate some sophistication in stochastic thresholding. Accordingly, a bi-directional counter can be advantageously implemented in tape mark determinations.

The block/gap meter uses the filtered output of the block/gap determination section as its input; thus, a uni-directional counter can be employed. The verify counter is used almost exclusively for write operations which require that even minor errors be corrected, and therefore can use a uni-directional counter to make consecutive counts only.

There are several advantages provided by the present invention summarized above and detailed below. The on-board state machine allows other components to make real-time determinations with an historical perspective. The historical state outputs can also be used to provide more reliable block-type determinations by resolving ambiguities against determinations known to be improbable in view of the state machine output.

For example, even with stochastic thresholding, sufficient noise makes it difficult to determine reliably the presence of a gap. However, if the state machine indicates that this activity occurs within a minimum gap length after a data record end mark has been detected, then the determination of gap is confirmed and a re-try or unrecoverable error, that would otherwise occur, can be averted.

The historical state outputs can be used by the block/gap filter in providing boundary position triggers by suppressing activity of trigger signals while it is known that the event of interest cannot occur. The last transition before suppression can then be used to effect a position capture that can be used by the drive controller to very precisely position during re-tries. The precision afforded is greater than in prior systems since the trigger is made in real-time and on the basis of historically based determinations.

In addition, the implementation of the block/gap thresholder and the use of stochastic thresholding make the block/detect circuitry less vulnerable to noise. The stochastic thresholding prevents, for example, several evenly spaced bit-long errors from impairing block or gap or tape mark recognition and forcing re-tries. The use of the block/gap filter provides for more reliable determinations by the block/gap meter sections which receives its output.

Thus, in accordance with the present invention, block detect circuitry provides for more reliable block-type recognition, more reliable block boundary positioning triggers, and reduced vulnerability to noise. A tape drive system incorporating such block detect circuitry makes fewer errors in recognition of block types, endures fewer re-tries due to noise, and more accurately positions when re-tries are required. Other advantages and features are apparent from the following description in view of the accompanying figures.

BRIEF DESCRIPTION OF THE DRAWINGS

FIG. 3, which comprises FIGS. 3A, 3B, and 3C, is a state diagram for a hardware state machine incorporated in the block detect circuitry of FIG. 1.

FIG. 6, which comprises

FIG. 7, which comprises

FIG. 8, which comprises

FIG. 9, which comprises

FIG. 10, which comprises

DESCRIPTION OF THE PREFERRED EMBODIMENTS

Figure 1:
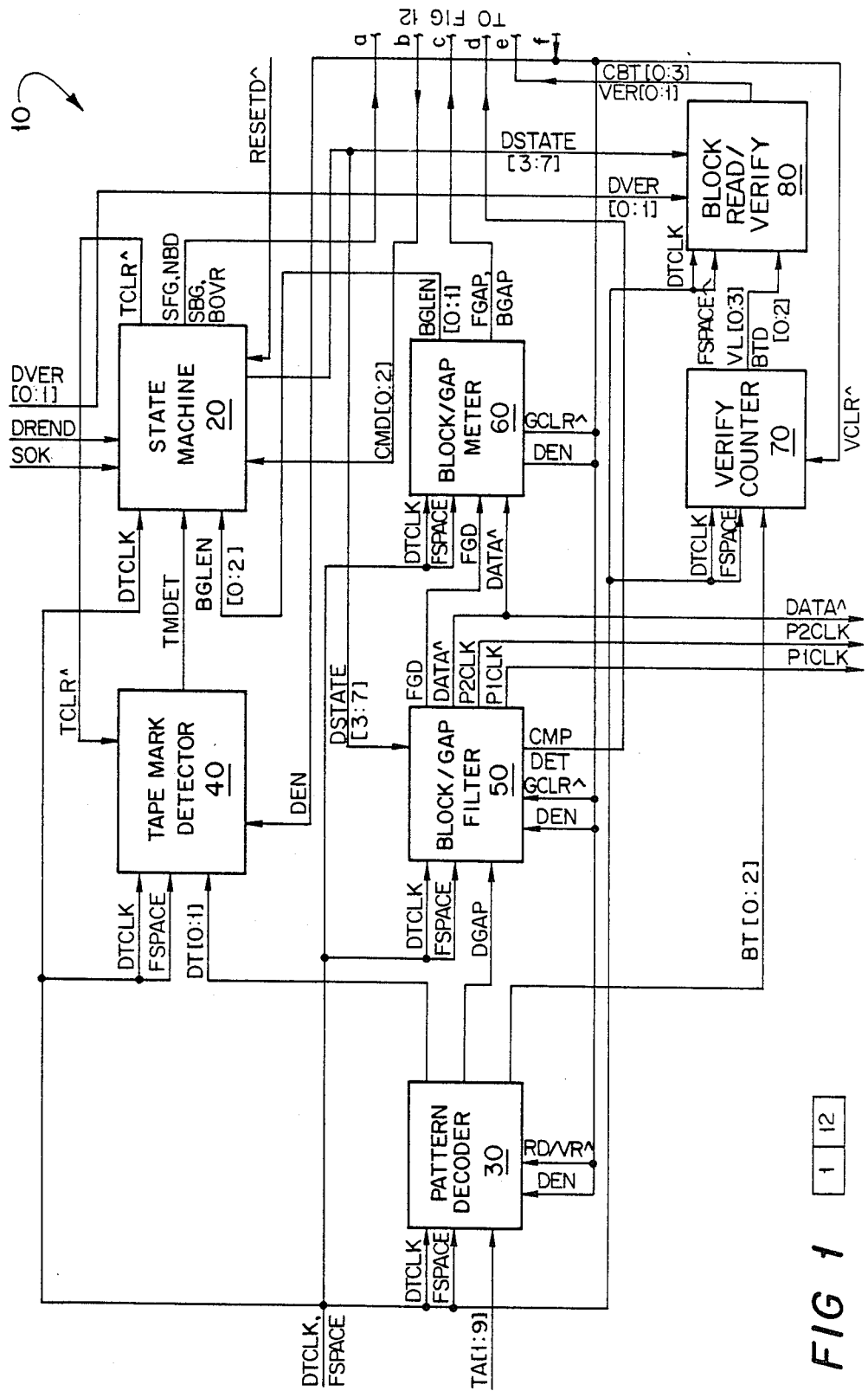
FIG. 1 is a block diagram of block detect circuitry in accordance with the present invention.
Figure 2:
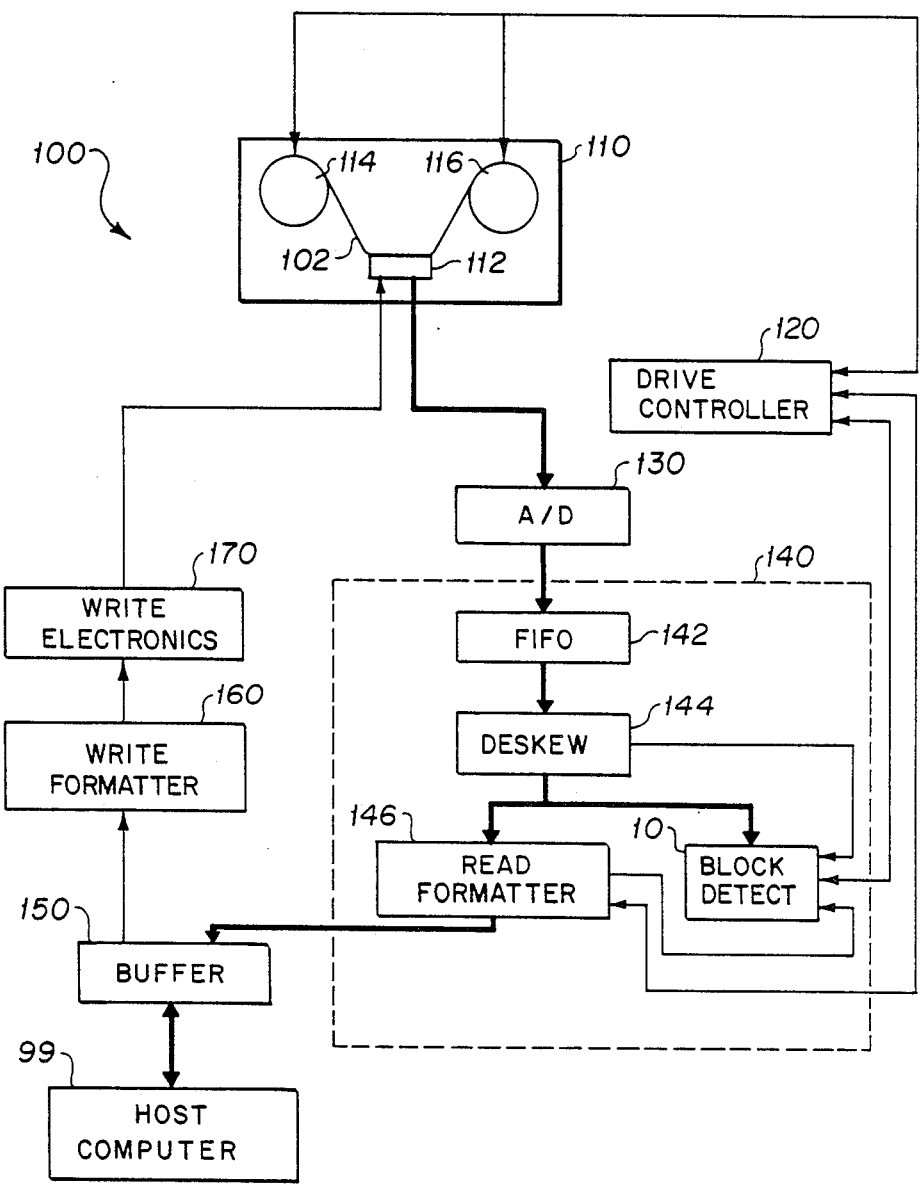
FIG. 2 is a schematic illustration of a streaming tape drive system incorporating the block detect circuitry of FIG. 1.

In accordance with the present invention, block detect circuitry 10 comprises a state machine 20, a pattern decoder 30, a tape mark detector 40, a block/gap filter 50, a block/gap meter 60, a verify counter 70, and a block read/verify circuit 80, as shown in FIG. 1. The block detect circuitry 10 provides for better error handling in the tape drive system 100 for storage and retrieval of data on a magnetic media tape 102 for a host computer 99, shown in FIG. 2.

The context of the block detect circuitry 10 is the tape drive system 100, which includes a drive mechanism 110 for transferring the magnetic media tape 102 across a read/write head assembly 112 between a supply reel 114 and a take-up reel 116. A drive controller 120 controls the motion of reels 114 and 116. The block detect circuitry 10 monitors track activity for the streaming tape drive system 100 so that a tape read/write strategy can be implemented by the drive controller 120 for the system.

Flux levels stored on the tape 102 are converted by the read head of assembly 112 into voltages which are processed and converted to discrete binary voltage levels by analog circuitry and A/D converter 130, which includes at its output a bank of phase lock loops. The output of the phase lock loops is directed to a digital formatter 140. This transfer is buffered by a read FIFO bank 142, which comprises parallel first-in first-out shift registers.

In the illustrated tape drive system 100, data is stored on tape 102 in nine parallel tracks which are processed in parallel by the analog circuitry and A/D converter 130 and the formatter 140. Due to mechanical misalignments in the tape drive system 100 and in the tape 102 relative to the head 112, and due to deformations in the tape 102, these parallel tracks can become skewed relative to each other. Accordingly, de-skew circuitry 144 is provided to coordinate the timings of the nine tracks on the basis of preamble patterns to data record blocks.

The digitized and de-skewed track activity data is then analyzed by the block detect circuitry 10 which identifies, locates and measures blocks of track activity and intervening gaps. Since the de-skew circuitry 144 operates on data blocks it can forward a synchronization valid signal to the block detect circuitry 10 to identify data blocks. The block detect circuitry 10 marks the boundaries of the data blocks and distinguishes gaps, tape marks, tape density IDs, and other non-data pattern types, and assigns verify levels to these determinations.

Those blocks identified as host computer data can be processed by a read/formatter 146 of the formatter 140. The read/formatter 146 receives de-skewed track activity data from the de-skew circuitry 144 in parallel with the block detect circuitry 10. The read/formatter 146 decodes the track activity data identified as user data by the de-skew circuitry 144.

Based on embedded error codes, error correction is performed and detected but uncorrected errors are flagged. Decoded host computer data is directed from the formatter 140 to a data buffer 150 for transfer to the host computer 99. Uncorrected error conditions flagged by formatter 140 are accessed by the drive controller 120 which can effect a re-try by issuing the appropriate commands to the drive mechanism 110.

As part of the error detection and correction process, the read/formatter 146 provides a verify level for data record blocks to the block detect circuitry 10. Postambles are detected and flagged for the block detect circuitry 10 to indicate the end of a data record block.

The tape drive system 100 also includes a write formatter 160 and write electronics 170. During a write operation, data is transferred from the host computer 99 through the data buffer 150 to the write formatter 160. After formatting and the inclusion of system data, the information is directed to the write electronics 170. The write electronics 170 converts the output of the write formatter 160 to analog form so that the write head of assembly 112 can convert the information to flux levels to be stored on the passing magnetic tape 102.

The write head is upstream of the read head so that, in a verify mode, the information can be read from the tape 102 after it is written. In the verify mode, operation is similar to read mode operation from the perspective of the read subsystem. However, in verify mode, there is no data output to the buffer. Also, more stringent thresholds are applied, since errors can be corrected by rewriting.

The inputs to the block detect circuitry 10 include TA[1:9], DTCLK, FSPACE, SOK, DREND, DVER[0:1], CMD[0:2], RESETD ⌃, RD/VR ⌃, DEN, GCLR ⌃, and VCLR ⌃, as shown in FIG. 1. These signals function as follows.

TA[1:9] is nine channels of "track activity" as provided via the de-skew circuitry 144. These nine channels carry the user and system data in the form of data blocks separated by inter-block gaps. It is the blocks of activity in these nine channels that the block detect circuitry 10 is designed to identify and locate.

DTCLK is a "detect clock" timing signal from the de-skew circuitry 144 originally established by the phase-locked loops in the analog and A/D conversion circuitry 130 of the streaming tape drive system 100. DTCLK serves as the clock input to all seven sections of the detect circuitry 10 of FIG. 1.

FSPACE is a "flux space" signal indicating DTCLK cycles during which data is valid. FSPACE is input to enable ports of the pattern decoder 30 and the thresholding sections 40–70. With respect to these sections 30–70, FSPACE and DTCLK function together as a data strobe.

SOK is a "synchronization okay" used to determine whether a detected block reflects user data, as opposed to system data. When a specific preamble pattern is detected in sufficient channels by the de-skew circuitry 144, SOK is generated by the de-skew circuitry 144, to indicate that user data is synchronized across channels.

DREND is a "data record end" signal used to identify the end of a block of user data. When the read/formatter 146 determines that sufficient channels include a specific data block postamble, DREND is generated to indicate the end of the respective data record.

DVER[0:1] is a pair of "data verify" signals used to establish the verification level of a data record. DVER[0:1] is generated by the read formatter 146 as error detection and correction is performed. The four values transmittable over the two DVER lines are: 00=no status, 01=hard error, 10 corrected error, and 11 perfect read without error detection.

CMD[0:2] is a set of "command" signals for determining transitions within the state machine 20. These commands are forwarded via the command and status port 90, FIG. 12, from the drive controller 120. Three bits are used by the command register to distinguish five messages: 000 "no operation", 001 STR "stream read command", 010 GWC "gap wait command", 011 SUC "start-up read command", and 111 "command clear". The stream read command is used when the block detect circuitry is to detect and read the next block. The start-up read command is dedicated to normal start-ups after reset, while the gap wait command is limited to use after a reset issued within a "gap" which was to short to be verified as such.

RESETD ^ is a "reset not" signal used to reset the state machine 20, and is also forwarded to reset the de-skew circuitry 146. It is encoded by a value in a set-up register of the command and status port 90 as loaded by the drive controller 146.

RD/VR is a "read" or "verify not" signal which functions to set the tolerance to which the pattern decoder 30 must adhere in encoding patterns. The tolerances are stricter for verify mode since there is an opportunity to correct the errors by re-writing. During read mode, the tolerances are relaxed, since the tape drive system 100 must take the incoming data as it is given and interpret it as best it can.

DEN is a "density" select signal used by the pattern decoder 30 to determine whether the decoding scheme should be for PE or GCR encoded signals. Likewise, the DEN is used to select appropriate thresholds for the tape mark detector 40, the block/gap filter 50, and the block/gap meter 60.

GCLR ^ is a "gap clear not" signal used for clearing the block/gap filter 50 and the block/gap meter 60.

VCLR ^ is a "verify clear not" signal used for clearing the verify counter 70.

Other illustrated set-up signals include the following. IDLE is a signal to the de-skew circuitry transmitted from the set-up register. FORWD, also stored in the set-up register, is a "forward not" signal used to indicate whether the tape 102 is moving in a forward or reverse direction. The various commands and statuses are stored in respective registers and are addressed along the SS4 and the A[0:3] lines between the drive controller 120 and the command and status port 90, shown in FIG. 12. Commands are written or status is read according to the value of R/W ^. The commands and status are communicated between the port 90 and the drive controller 120 along an eight-bit bus D[0:7]. The remaining inputs to the command and status port 90 from the drive controller 120 include a power valid PVALID signal, and system clocks ECLK and QCLK, all serving conventional functions.

The outputs from the block detect circuitry 10 include DATA ^, P1CLK, P2CLK, CBT[0:3], VER[0:1], DET, CMP, FGAP, BGAP, SFG, SBG, NBD and BOVR. The significance of these is as follows.

CBT[0:3] is a set of signals indicating "current block type", such indication being a major function of the block detect circuitry 10. This information is output from the block read/verify circuit 80 to the command and status port 90 whence it is accessible by the drive controller 120.

VER[0:1] is a pair of signals indicating "verify level". The specific interpretation is dependent on CBT[0:3]. These signals are characterized in greater detail in connection with the discussion of the block read/verify circuit 80, below.

DATA ^ is a "data not" output from the block/gap filter 50 to the read formatter 146 indicating whether a block or a gap is current.

P1CLK is a "first position clock" signal used to trigger position captures locating gap-to-block boundaries. P1CLK leads DATA ^ by one DTCLK cycle until suppressed according to a state machine output indicating that a block is present or has just ended. The last rising edge of the P1CLK before suppression is used to trigger position capture circuitry. The position so captured is accessible to the drive controller 120 to permit precise positioning during re-tries.

P2CLK is a "second position clock" signal used to trigger position captures locating block-to-gap boundaries. P2CLK leads DATA ^ by one DTCLK cycle until suppressed according to a state machine output indicating that a block has just ended. Together, P1CLK and P2CLK serve to delimit blocks so that the servo controller 120 can effect precise positioning during re-tries.

^DET is a "detect" signal accessible to the drive controller 120 via the command and status port 90 indicating whether a block is current or just past. Essentially, DET follows the suppression of P1CLK.

CMP is a "complete" signal accessible to the drive controller 120 indicating whether a block has just past. Essentially, CMP follows the suppression of P2CLK.

FGAP is a "filtered gap" signal accessible to the drive controller 120 indicating whether or not a gap is current. FGAP essentially follows DATA ^, but is output from the block/gap meter 60.

BGAP is a "big gap" signal accessible to the drive controller 120 indicating whether the current block or gap has attained a pre-programmed threshold at the block/gap meter 60. FGAP and BGAP are stored in a flag register of the command and status port 90.

Figure 3A:
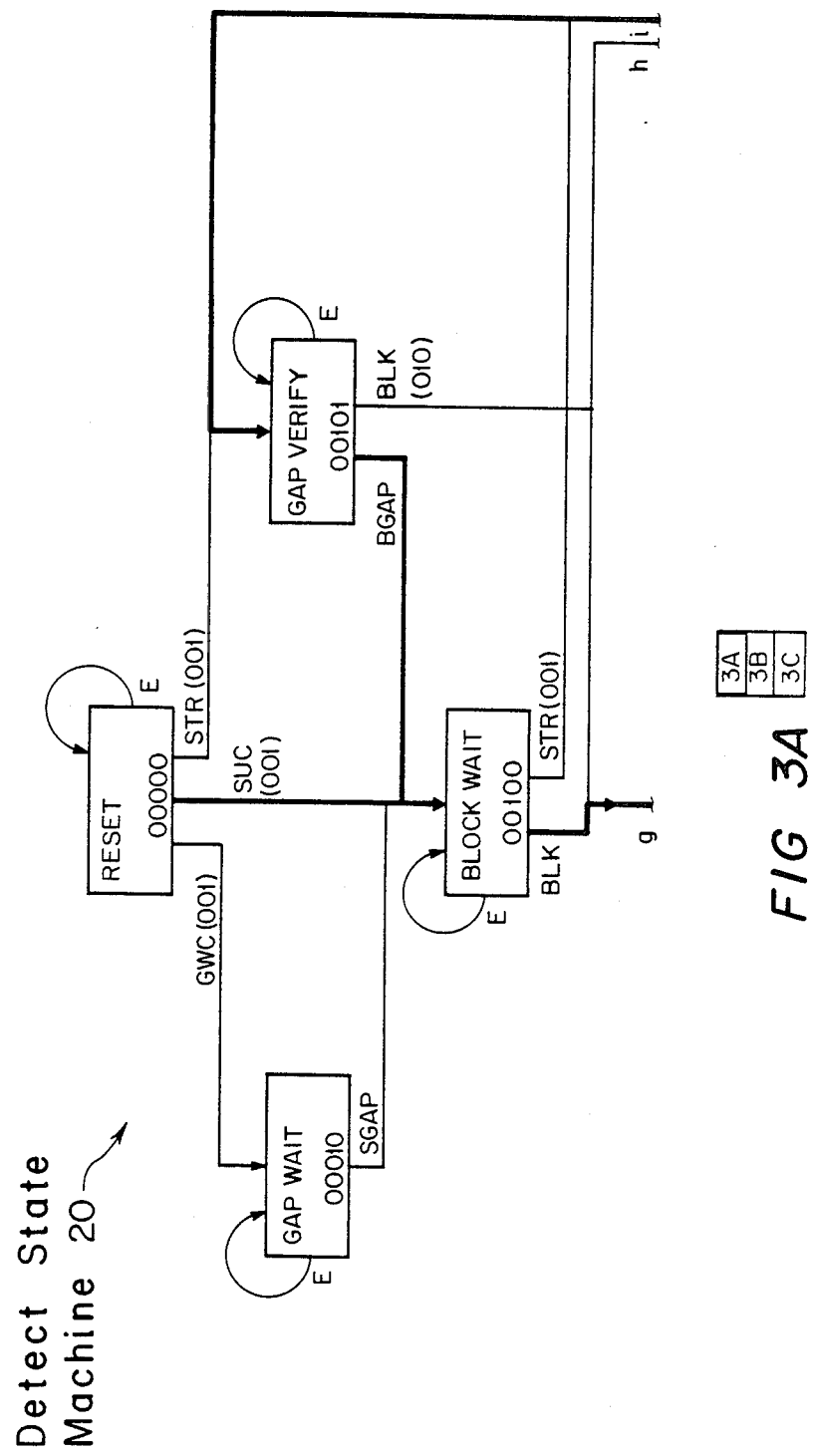

SFG is a "short front gap" identifier output from the state machine 20 along a three bit bus to the flag register of the command and status port 90. A short front gap is flagged during a state machine transition when a block is detected before a minimum gap length has been verified. This flag is transmitted as 010, as indicated in FIG. 3A.

SBG is a "short back gap" identifier differing from SFG only in that it occurs after a block has ended and no stream command has been issued. It is transmitted as 101, as indicated in FIG. 3C.

NBD is a "noise before detect" identifier indicating that activity detected was probably noise within a gap. This flag issues when activity too short to be a meaningful block is followed by a lack of activity over too short a duration to qualify as an inter-record gap, which is in turn followed by the detection of another block. NBD is transmitted as 011, as indicated in FIG. 3B.

BOVR is a "block overrun" identifier indicating that a block has been detected before a stream command has been issued. BOVR is transmitted as 110, as indicated in FIG. 3C.

Figure 3B:
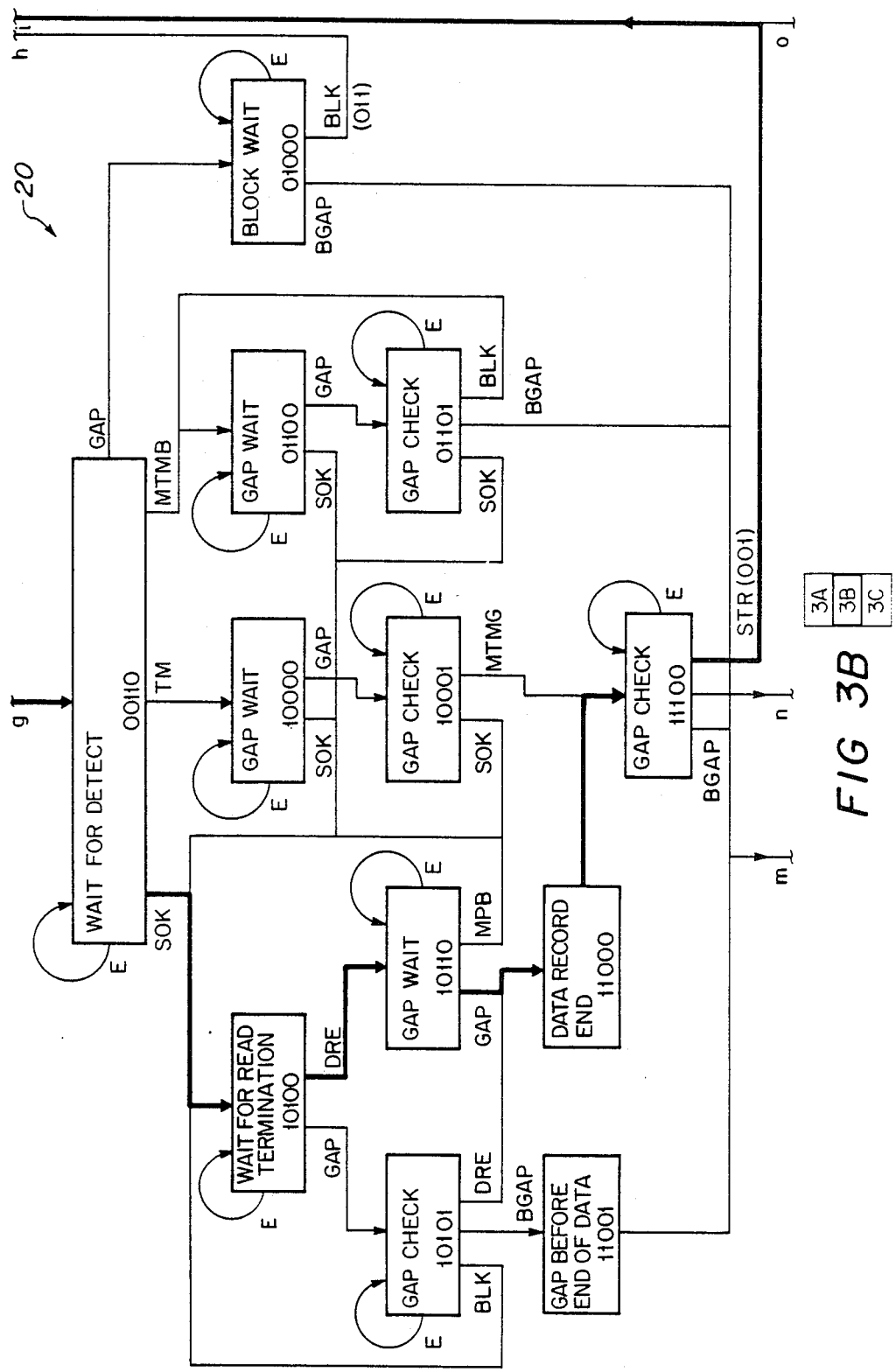

In addition to the foregoing error flags, a transmission of 001, , as indicated in FIGS. 3A, 3B and 3C, clears the most recent command, i.e., STR, SUC or GWC, and issues a TCLR ^ to reset tape mark detector 40.

Considered in the context of the described tape drive system 100, the block detect circuitry 10 functions to monitor track activity signals TA[1:9] from the de-skew circuitry 144. Track synchronization and end of data signals are monitored to delimit de-skewed user data blocks. Blocks of track activity and interblock gaps are recognized as such, gap noise and small dropouts within blocks being filtered.

The incidence of gap-to-block and block-to-gap boundaries are noted so that their positions can be precisely recorded by position capture circuitry, not shown, to provide the drive controller 120 a means to accurately position the drive mechanisms 110 during re-tries. Block types are identified, and the identifications verified. On read after write, verification that non-data blocks meet American National Standards Institute (ANSI) standards is performed.

The role of each of the eight sections of the block detect circuitry in performing these functions is as follows. The pattern decoder 30 of the block detect circuitry 10 determines the type of track activity being read from the tape. The track activity signals TA[1:9] from the de-skew circuity 144 are analyzed to yield detect type signals DT[0:1] for the tape mark detector 40, a "detected gap" signal DGAP for the block/gap filter 50, and block type signals BT[0:2] for the verify sections 70 and 80. All of these determination are made once per FSPACE strobe. However, for reliable determinations to be made, the patterns must be evaluated over time.

The tape mark detector 40 examines the detect type signals DT[0:1] over time to determine whether in fact a tape mark has been detected. The detect type signal DT[0:1] provides four values corresponding to tape mark, ID, data block and miscellaneous/unknown. The tape mark detector 40 counts up tape mark detections, counts down detections known not to be tape marks, e.g. data blocks and IDs, and idles during miscellaneous/unknown detections. In response to an actual tape mark, and despite noise, the tape mark detector 40 should count up to a pre-programmed threshold at which it issues a tape mark detect signal TMDET to the detect state machine 20.

The block/gap filter 50 receives the raw gap signal DGAP from the pattern decoder 30, counting up consecutive flux spaces either as gap or as block. When a density dependent threshold is met, a "filtered gap" signal FGAP is toggled appropriately. A "not data" signal DATA~, the FGAP signal delayed one DTCLK cycle, is also provided.

The filtered gap signal is used with a DSTATE[3:7] input from the detect state machine 20 to provide the two tape positioning clocks. P1CLK marks a gap-to-block boundary and P2CLK marks a block-to-gap boundary. As indicated above, these signals trigger position capture circuity, not shown, to record the respective boundary positions for eventual access by the drive controller 120. The use of the block/gap filter 50 makes the block detect circuitry 10 less vulnerable to noise within gaps and dropouts within blocks. This is another factor in the present invention's ability to render unnecessary certain re-tries.

The block/gap meter 60 measures and encodes the length of the block or gap currently being read from the tape 102. More specifically, it counts up consecutive flux spaces indicated by the filtered gap signal FGD. Transitions between gaps and blocks are indicated when FGD and DATA~ are different, this condition resetting the block/gap meter 60. The measured length is coded to provide block length signals BGLEN[0:2] for the detect state machine 20.

The verify counter 70 validates IDs and marks written on the tape by counting consecutive flux spaces during a constant block type reading BT[0:2] from the pattern decoder 30. The result is a verify level VL[0:3] which is directed to the block read/verify circuit 80. The verify counter 70 also outputs a block type delayed signal BTD[0:2], which is BT[0:2] delayed two DTCLK cycles.

The block read/verify circuit 80 uses the verify level VL[0:3], the block type reading BT[0:2], the current detect state DSTATE[3:7] for the detect state machine 20, and data verify signals DVER[0:1] from the read/formatter 146 to generate signals representing the current block type CBT[0:3] and a verify type VER[0:1]. These latter signals are directed to the command and status port 90.

The command and status port 90 interfaces the block detect circuitry 10 with the drive controller 120. It receives setups and commands and returns status and flags.

The detect state machine 20 oversees the reading of blocks from the tape 102. When given a read command, the detect state machine 20 waits for the start of a block, performs block type detection, waits for the end of the block, then checks the inter-block gap. The detect state machine receives the synchronization valid signal SOK, the data record end DREND, the tape mark detect signal TMDET, and the block/gap length signals BGLEN[0:2]. In addition, command signals CMD[0:2] and reset signal RESET ~ are received via the command and status port 90.

The detect state machine 20 generates detect state signals DSTATE[0:7] which are latched as status bits by the command and status port 90. Some of the detect state signals DSTATE[3:7] are used by the block/gap filter 40 and the block read/verify circuit 80, as indicated above. The detect state machine 20 also sets detect flags in the command and status port 90. These detect flags are "short front gap" SFG, "noise before detect" NBD, "short back gap" SBG, and "block overrun" BOVR.

STATE MACHINE

The operation of the detect state machine is described in greater detail with reference to the flow chart of FIG. 3. The detect state machine 20 oversees the reading of each recorded block on the tape 102. The beginning of each block is detected, the block read, and then the gap following the block is found. Inter-block gaps are verified and a block overrun condition trapped.

The state machine 20 provides for 18 states with 8-bit outputs. The lower three bits DSTATE[0:2] of the detect state outputs represent the command clear and error flags. The remaining five bits DSTATE[3:7] of the output identify the current state of the state machine 80. These are the five bits transmitted to the block/gap filter 50 and the block read/verify circuit 80.

One block is read for each pass through the state diagram of FIG. 3. Reading occurs in three phases. Except for a reset state 00000, all state machine states are contained by one of these phases. The first phase, pre-detect, encompasses the gap wait 00010, gap verify 00101, block wait 00100, wait for detect 00110, and block wait 01000. These states occur prior to the detection of a block.

The second phase, read, encompasses states in three groups. Which of the groups of states is used depends on the block type detected. The data block read states are wait for read termination 10100, gap check 10101, gap wait 10110, gap before end of data 11001, and data record end 11000. The tape mark read states are gap wait 10000, and gap check 10001. The other block read states are gap wait 01100 and gap check 01101.

The third phase involves checking the gap following a block read. These include gap check 11100, gap check 11101 and the trap for block overrun 11111.

State transitions occur based on the present state and the value of thirteen conditions codes. These conditions codes are:

| | |
|---|---|
| GWC | Gap wait command |

| | -continued |
|---|---|
| | from detect command register |
| STR | Stream command |
| | from detect command register |
| SUC | Start-up read command |
| | from detect command register |
| BLK | In block |
| | from block/gap meter |
| MTMB | In block > maximum length of tape mark |
| | from block/gap meter |
| MPB | In block > maximum length for a postamble |
| | from block/gap meter |
| GAP | In gap |
| | from block/gap meter |
| MTMG | In gap > length of maximum tape mark |
| | from block/gap meter |
| SGRP | In gap > 0.1 inch |
| | from block/gap meter |
| BGAP | In gap > 0.25 inch |
| | from block/gap meter |
| SOK | Sync OK |
| | from de-skew circuitry |
| DRE | Data record end |
| | from read/formatter |
| TM | Tape mark detect |
| | from tape mark detector |
| E | Else |

Upon certain state transitions output codes are directed to a detect flag register in the command and status port 90. As indicated earlier, these codes are command clear (001), short front gap SFB (010), noise before detect NBD (011), short back gap SBG (101) and block overrun BOVR (110). In addition, most of the states include else loops E, indicating that the state is retained until a condition code permitting a state transition is received.

The most common sequence of states should be error-free detecting, reading and checking gaps after data blocks. Beginning with the reset state 00000 of FIG. 3, this path is entered upon receipt of a start-up read SUC command via the status and command port 90. The SUC command initiates a transition to the block wait state 00100. Upon the receipt of a block start command BLK from the block/length meter 60, a transition is made to the wait for detect state 00110.

A synchronization valid signal SOK from the de-skew circuitry initiates the second phase with the read termination state 10100. A data record end DREND signal from the read/formatter initiates a transition to gap wait state 10110. When the onset of a gap is signalled by GAP from the block/gap meter 70, a one DTCLK cycle transition through a data record end state 11000 is made to the gap check state 11100 of the third phase of the state machine 20.

A stream command STR from the command and status port 90 returns the system to phase 1, and more specifically, to the gap verify state 00101. Along with the stream command, a command clear 001 is issued to clear the commands, and TCLR ^ is issued to reset the tape mark detector 40. A big gap BGAP signal from the block/gap meter 60 causes a transition to block wait state 00100, which was accessed previously from the reset state 0000. Thus, the progression from block wait state 00100 to gap check state 11100 and back to gap verify state 00101 is reiterated during normal operation.

At the end of a data file, a tape mark can be detected during normal operation. Thus, a tape mark detect TM condition code in response to a TMDET from the tape mark detector 40 causes a transition from the wait for detect state 00110 to a gap wait 10000 in the second group of states of the second phase of the state machine 20. A GAP condition code causes a transition to the gap check state 10001. When the block/gap meter 60 attains the appropriate threshold, a MTMG code signals that the gap following the tape mark has a length greater than a maximum tape mark, and effects a transition to gap check 11100.

A stream command STR causes the main state machine to re-enter the main path. As the stream command is issued, command clear 001 clears the commands and causes TCLR ^ to reset the tape mark detector.

The state machine includes many branches to handle alternative situations. For example, if, while in gap wait state 10110, which can only be entered when a data record end DRE is detected, the block continues for a length greater than a maximum postamble, i.e. condition code MPB is issued, then an inter-record gap presumable was obscured by noise, or the DRE was a false indication. In either case, it is appropriate to re-initiate the search for a new data record end. Thus, the MPB code initiates a transition back to the wait for read termination 10100.

In another example, if, while in wait for read termination state 10100, a gap GAP is detected before a data record end DRE, a transition is made to gap check 10101. If, before the detected gap measures a quarter inch, a block is detected, it is presumed that the detected gap was really a full-width drop-out and that the system should still be reading the current block. Accordingly, a transition is made back to wait for read termination 10100. This is an error condition which could be signalled by the state machine 20. However, in the present embodiment, the read/formatter 146 is arranged to signal this error on the basis of its reading of the block along with DATA .

If a data record end DRE is detected instead of a block, a full-width drop-out is again presumed. This error condition can also be signalled by the read/formatter using DATA ^ . The transition is made to data record end state 11000, which causes the main state machine path to be re-entered.

If neither a data record end DRE or a block BLK are indicated, and the gap that caused gap check state 10101 to be entered is measured to be greater than 0.25 inches, then it can be assumed that a full-width drop-out wiped out the end of a data block. A transition is made to gap before end of data 11001, which is a state which can only be entered under an error condition. Therefore, this error can be signalled by the state machine output, but can also be signalled by the read/formatter using DATA ^ .

Like the data record end state 11000 this gap before end of data state 11001 is exited after one DTCLK cycle. In this case the transition is to gap check state 11101, rather than gap check state 11100. The difference between these two third-phase gap check states is gap check state 11101 indicates that a greater than 0.25" gap BGAP has already occurred, while gap check state 11100 indicates that this length has not been achieved. If while in gap check state 11100, a BGAP is received, a transition is made to gap check 11101.

As in the case of gap check 11100, a stream command STR causes a transition to the phase 1 gap verify state 00101 so the main path can be entered. If on the other end, while in either third-phase gap check 11100 or 11101 a BLK is detected before a stream command STR is received, a block overrun state 11111 is entered. As the block overrun state is entered from gap check 11100, a short back gap SBG 101 error signal is issued;

as the block overrun state is entered from gap check 11101, a block overrun BOVR 110 is issued. In either case, BOVR 110 is continuously issued once block overrun state 11111 is entered. A RESETD ⌐ is required to effect a transition from this state to reset 00000.

In the event a block is detected so that the machine is in wait for detect state 00110, but no SOK or TM condition code has been received, one can assume that an error has occurred. However, the block read/verify circuit 80 could indicate that an ID or other specialized tape mark is being detected. After an in block longer than maximum tape mark condition code MTMB, a transition is made to gap wait state 01100 in the third branch of the second phase of the state machine 20.

If a gap is in fact detected, a transition is made to gap check state 01101. If the block turns out to be a "big gap" BGAP, then a transition is made to the third-phase gap check state 11101, whence the main state machine path can be entered. If instead, a BLK is detected again before the gap reaches the BGAP threshold, then a drop-out in an unknown block type is presumed, and a transition is made back to gap wait 01100 in this third branch of phase two.

The synchronization valid signal SOK is given a high priority among the condition codes. The effect is that if it is asserted anytime during the states in the tape mark or unknown block type branches of the second phase, a transitions is made to first branch of the second phase. More specifically, the transition is to wait for read termination state 10100. Thus a TM or unknown determination can be superceded by an indication from the read/formatter 146 that the present block is a data block.

While in the wait for detect state 00110, if a gap is detected before the block attains the length of a maximum tape mark, and if SOK and TM are not asserted, then a transition is made to block wait state 01000, still in phase 1. This state always indicates a error condition. If the gap attains BGAP length, a transition is made directly to third-phase gap check 11101. This sequence indicates either that the detected block effecting the transition to wait for detect state 00110 was noise or that a block was largely obliterated. In either case, a stream command STR effects re-entry to the main path.

On the other hand, if before BGAP length is attained, a block BLK is again detected, the previous BLK effecting entry to wait for detect state 00110 is presumed to reflect noise. Accordingly a noise before detect error code NBD 011 is issued, and the wait for detect state 00110 is re-entered.

As indicated above, the stream command STR can effect transition to the gap verify state 00101 of phase 1 from either third-phase gap check state 11100 or 11101. The stream command STR can also effect a transition to this gap verify state 00101 from the reset state 00000 or from the block wait state 00100, provided a block has not yet been detected.

Also as indicated above, the normal exit from the gap verify state 00101 is via a BGAP condition code to block wait state 00100. However, this block wait state 00100 can be skipped if BLK is issued before BGAP. Since this indicates a shorter than normal gap has occurred, a short front gap SFG 010 is issued in this instance.

In some implementations, it might be desireable to reserve the start-up command SUC for situations in g which the system is in a gap known to be of minimum standard size, i.e. at least 0.25 inches long. Therefore, provision can be made to exit the reset state 00000 with a gap wait command GWC, effecting entry to a gap wait state 00010. In this case, a short gap command SGAP indicating a gap of at least 0.1 inches could be used to exit the gap wait state 00010 and enter block wait state 00100.

The state machine 20 is implemented in hardware within the block detect circuitry 10 to permit real-time feedback of state data. The state data represents historical sequences as outlined above. The state machine outputs then provide a historical perspective to pattern determinations by the block/gap filter 50 and the block read/verify circuit 80, as indicated above.

Figure 4:
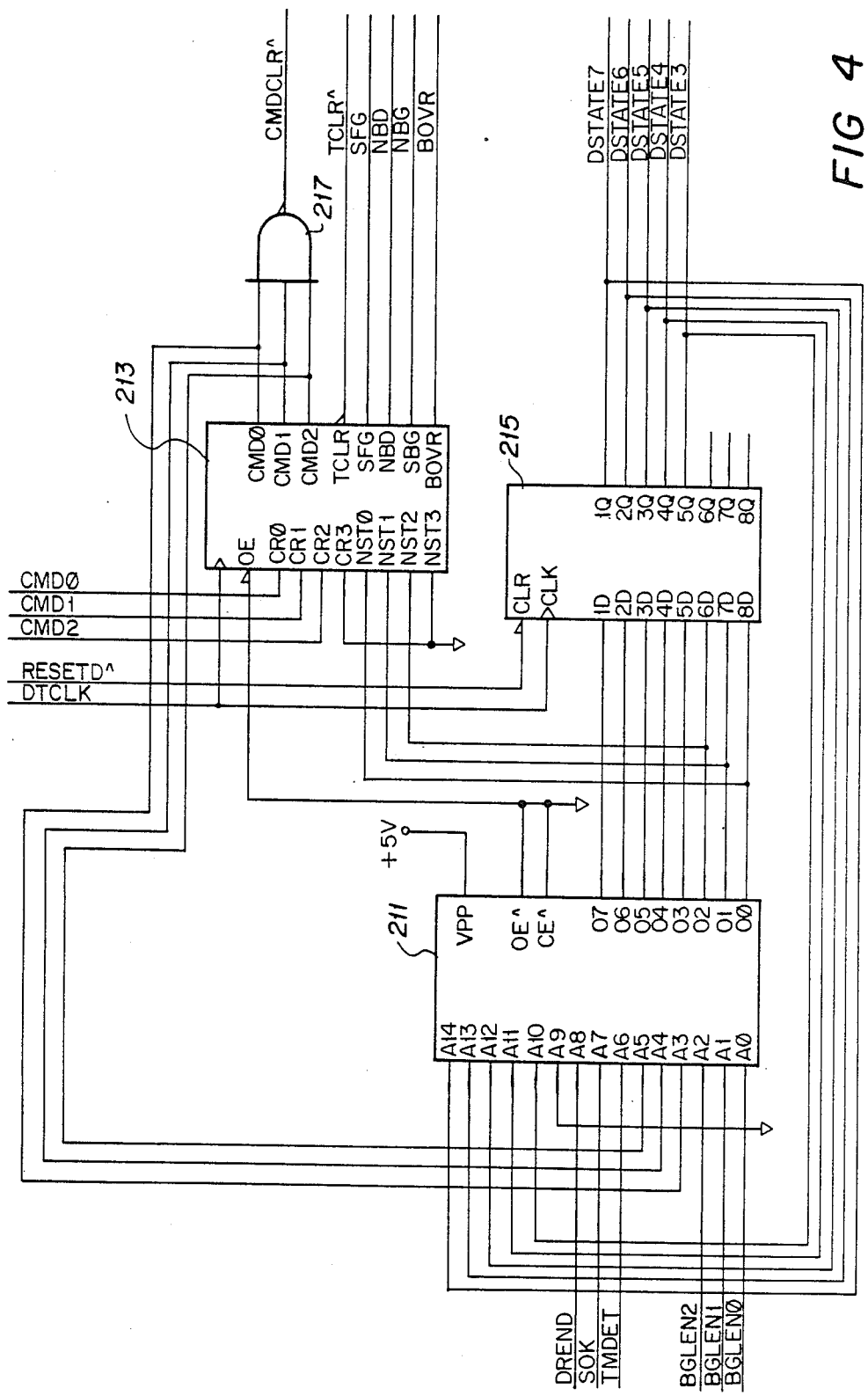
FIG. 4 is a logic circuit diagram of the hardware state machine referred to in FIG. 3.

The hardware of the state machine 20 comprises a look-up table ROM 211, a programmable logic array (PLA) 213, and an octal D-type flip-flop 215, as shown in FIG. 4. The PLA 213 and the flip-flop 215 are clocked by DTCLK and cleared by RESETD ⌐ from the command and status port 90. The 15 bits of addressing for the ROM are divided as follows. A0–A2 receive the BGLEN[0:2] input from the block/gap meter 60. A3–A5 indirectly receive CMD[0:2] from the drive controller. TMDET from the tape mark detector 40 is received at A6; SOK from the de-skew circuitry 144 is received at A7; and DREND from the read/formatter 146 is received at A8. The previous state is input at A9–A14 from the output of flip-flop 215.

The current state is represented by the upper five output ports D3–D7 of the ROM 211. These five bits are directed to the block/gap filter 50 and the block read/verify circuit 80 as indicated above. Error conditions and command clear are output from the lower three output ports D0–D2. Thus, the current state and the error codes are a function of the previous state, the current command, the current block/gap length, and the status of TMDET, SOK and DREND.

PLA 213 comprises two functional sections, a command section and a flag section. The command section latches commands along CMD[0:2] as received via the command and status port 90. The flag section decodes inputs from ROM 211 at "next state" in-ports NST0-2 into the respective error flags: block overrun BOVR, short back gap SBG, noise before detect NBD and short front gap SFG. The flag section also decodes a 001 input to activate TCLR ⌐ and reset CMDO-2 outports.

The lower three bits of commands are sent from the PLA outputs CMDO-2 to the ROM 211. CR[0:2] inputs to the ROM 211 remain active until the state machine 20 is in a state that can acknowledge the applied command. Once a command is acknowledged and acted upon, it is cleared.

To illustrate a command sequence, when a stream command is issued while the state machine 20 is in gap check state 11100, the command is received at CR0-2 in-ports of PLA 213, and transmitted from the CMDO-2 out-ports of PLA 213 to in-ports A3–5 of ROM 211. At the same time, the state 11100 is output from 1Q–5Q of the flip-flop 215 to in-ports A10–14 of ROM 211. The ROM then outputs 00101001, indicating a command clear 001 and gap verify state 00101.

The command clear 001 activates TCLR ⌐ from the PLA outport TCLR and sets CMDO-2 high. TCLR ⌐ resets the tape mark detector 40, while the high CMD outputs activate CMDCLR ⌐ which clears the command register of the command and status port 90. This in turn drives lines CMD[0:2] low, which in turn drives PLA in-ports CR0-2 low, which in turn drives PLA out-ports CMD0-2 low, releasing CMDCLR ˆ. The low outputs from COM0-2 of the PLA 213 are also received by the ROM at A3-6.

PATTERN DECODER

The pattern decoder 30 serves to identify and encode instantaneous track activity data. It is programmed to recognize predetermine patterns such as all tracks active representing a data block, no tracks active representing an inter-block gap, certain tracks active representing tape marks and various ID marks.

Figure 5:
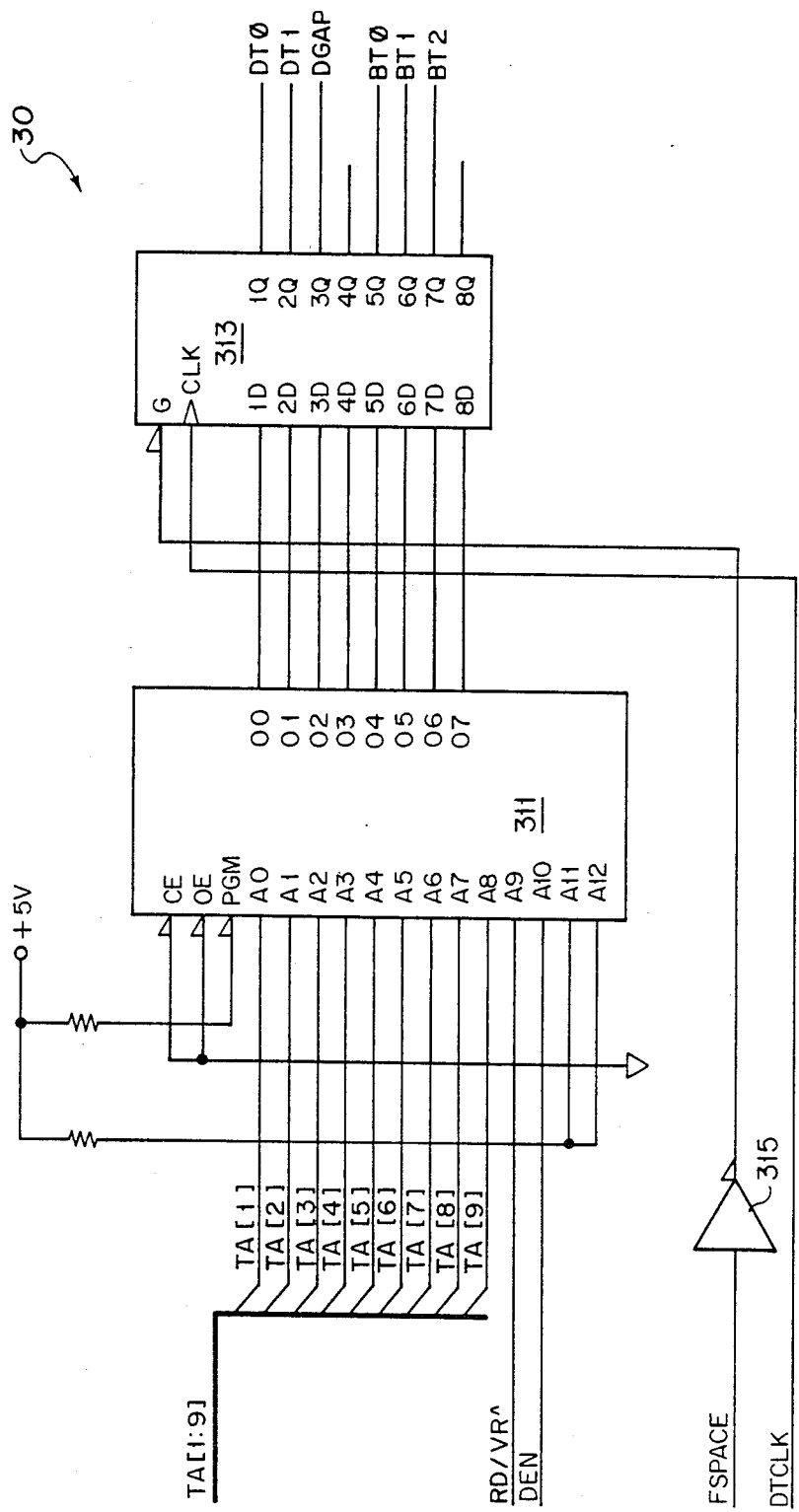
FIG. 5 is a logic circuit diagram of a pattern decoder incorporated in the block detect circuitry of FIG. 1.

As shown in FIG. 5, the pattern decoder 30 comprises a look-up table ROM 311 and an octal D-type flip-flop 313. The inputs to the ROM 311 include the track activity lines TA[1:9]. At any given moment, the current pattern of track activity determines nine lowest bits A0-A8 in the addressing scheme for the ROM 311.

The two other active inputs A9 and A10 are tied to the read/verify RD/VR ˆ mode select signal and the density mode select signal DEN. These two bits can be considered as selecting which of four tables within the ROM 311 is active. The nine tracks of flux activity determine the address within the active table, and the eight-bit value at that address is output at 00-07.

The octal D-type flip-flop 313 latches this output as clocked by the DTCLK input when enabled by the FSPACE signal which serves as a data valid strobe at input G of the D-type flip-flop 313. Since this G input is active low, inverter 315 is included to give the appropriate sense to the FSPACE signal.

The ROM 311 maps channel activity to pattern types. For example, the absence of track activity in all tracks is decoded as a gap. Activity in all tracks is decoded as a data block, or a synchronization or automatic amplification control burst. Predetermined patterns of activity and non-activity would be decoded as respective tape marks and recording format IDs, such as phase encoded recording, double-density phase encoded recording, and group code recording, the patterns for which are standardized.

The outputs of the ROM 311 and the D-type flip-flop 313 include three functional groups. The first is a single line detect gap DGAP output distinguishes a gap from other. The DGAP output from the pattern decoder 30 is a raw unfiltered gap detect signal. It is valid when and only when there is no activity in any of the nine tracks. In other words, when there are no flux reversals in the current flux space, DGAP is valid. DGAP is provided for use by the block/gap filter 50.

The second group, transmitted along, a three bit bus BT[0:2], distinguishes six block types. Three of these are recording format IDs, i.e., PE ID, DPE ID and GCR ID. The remaining three are used to represent, respectively, data blocks and automatic record amplification (ARA) bursts, ARA identification marks, and data/unknown.

The data/ARA block type has activity in all nine tracks. An ARA burst is provided for automatic read amplification for read electronics with the capability of automatically setting gain. The end of an ARA burst is typically marked with an ARA ID, which has activity in some tracks and erasure in others.

Data/unknown is any activity that does not fit the previous categories. It may be a data record with one track dropped out, it might be another type of block that has been corrupted.

Finally, ROM 311 provides, at outputs A0-A2, a two-bit "detect-type" group DT[0:1], which distinguish tape mark patterns, data blocks, ID patterns and other. This output is used by the tape mark detector 40.

TAPE MARK DETECTOR

The tape mark detector 40 determines if the block currently being read from the tape is a tape mark. The tape mark detect circuit utilizes the detect type signals DT[0:1] from the pattern decode circuit along with the flux spacing strobe from the de-skew circuitry.

Flux spaces which match that of a tape mark are counted up, while flux spaces which match those of an ID or data block are counted down. Flux spaces which are gap or unrecognizable are ignored. When a density dependent count threshold is met, the tape mark detect signal (TMDET) is asserted for detect state machine 20. The TMDET flag is set until cleared by TCLR ˆ.

Figure 6A:
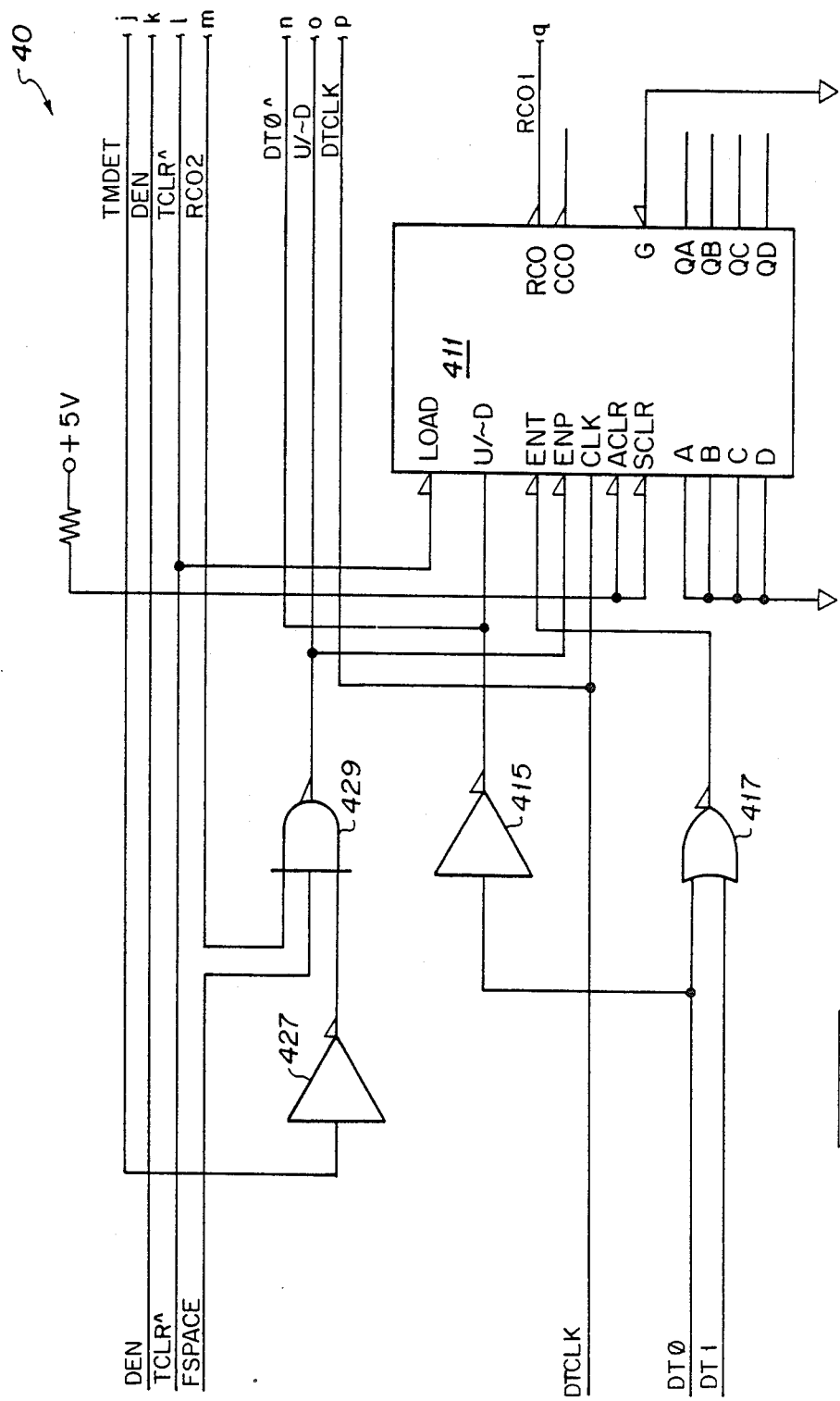
FIGS. 6A and 6B, is a logic circuit diagram for a tape mark detector incorporated in the block detect circuitry of FIG. 1.
Figure 6B:
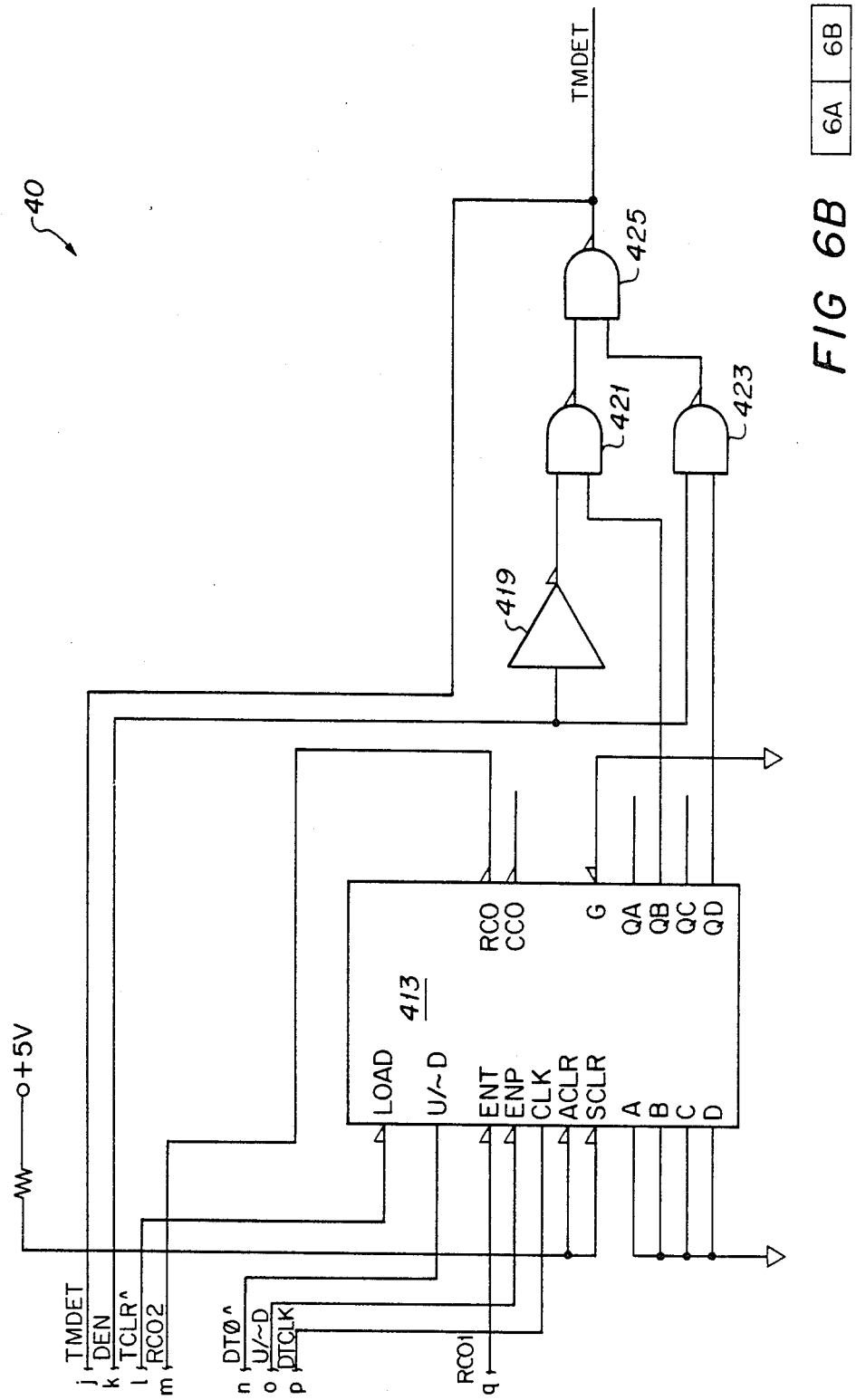

The tape mark detector 40 comprises cascaded bi-directional counters 411 and 413 to permit counts up to the 128 used in the illustrated embodiment to verify tape marks in GCR format, as shown in FIG. 6. Inverter 415 and NOR gate 417 provide the logic to implement an up count on a tape mark detection, a down count on a block or ID detection, and a "hold" otherwise. The counting is governed by the detect clock DTCLK and FSPACE strobe.

The logic at the tape mark detector, i.e., comprising inverter 419, and NAND gates 421, 423 and 425, is designed to select either the QB or the QD output of counter 413 as the source for the tape mark detect TMDET output of the tape mark section 40. This selection is a function of the recording format, as indicated by the DEN signal.

The logic associated with the flux space strobe FSPACE input, i.e., comprising inverter 427 and NAND gate 429, is tied to enables ENP of the counters 411 and 413. This latter logic is also used to stop the count when the selected threshold is achieved. On a tape mark detect clear TCLR ˆ command, both counters are reset by activating the LOAD enables of the counters while all load inputs are tied to ground.

The use of the up/down counters effects a stochastic determination of pattern type. This is contrasted with conventional approaches which count consecutive spaces. These latter can be confused by intermittent noise which breaks consecutive detections frequently enough to prevent the predetermined threshold from being attained.

In the present stochastic implementation, drop ins or drop outs within the tape mark merely delay the decision as to whether it is a tape mark. On the other hand, patterns belonging to an alternative block type are counted down, decreasing the probability that a tape mark will be determined. This helps prevent the erroneous recognition of non-tape marks as tape marks. In GCR, activity in at least 5 of tracks 1, 2, 4, 5, 7, and 8 with erasure in tracks 3, 6, and 9 increments the tape mark detect counters. A tape mark is indicated upon a count of 128, which provides an output at QD of counter 413. In PE, activity in at least 2 of tracks 2, 5 and 8 with erasure in tracks 3, 6, and 9 increments the tape mark detect counters. In this format, a tape mark is indicated by a high output at QB of counter 413, representing a count of 32.

Activity patterns looking like an ID or a data block (activity in 8 of the 9 tracks) decrement the tape mark detect counter. Other activity patterns including gaps do not effect the count. The count cannot decrement below zero nor change once the detect count has been reached.

BLOCK/GAP FILTER

Figure 7A:
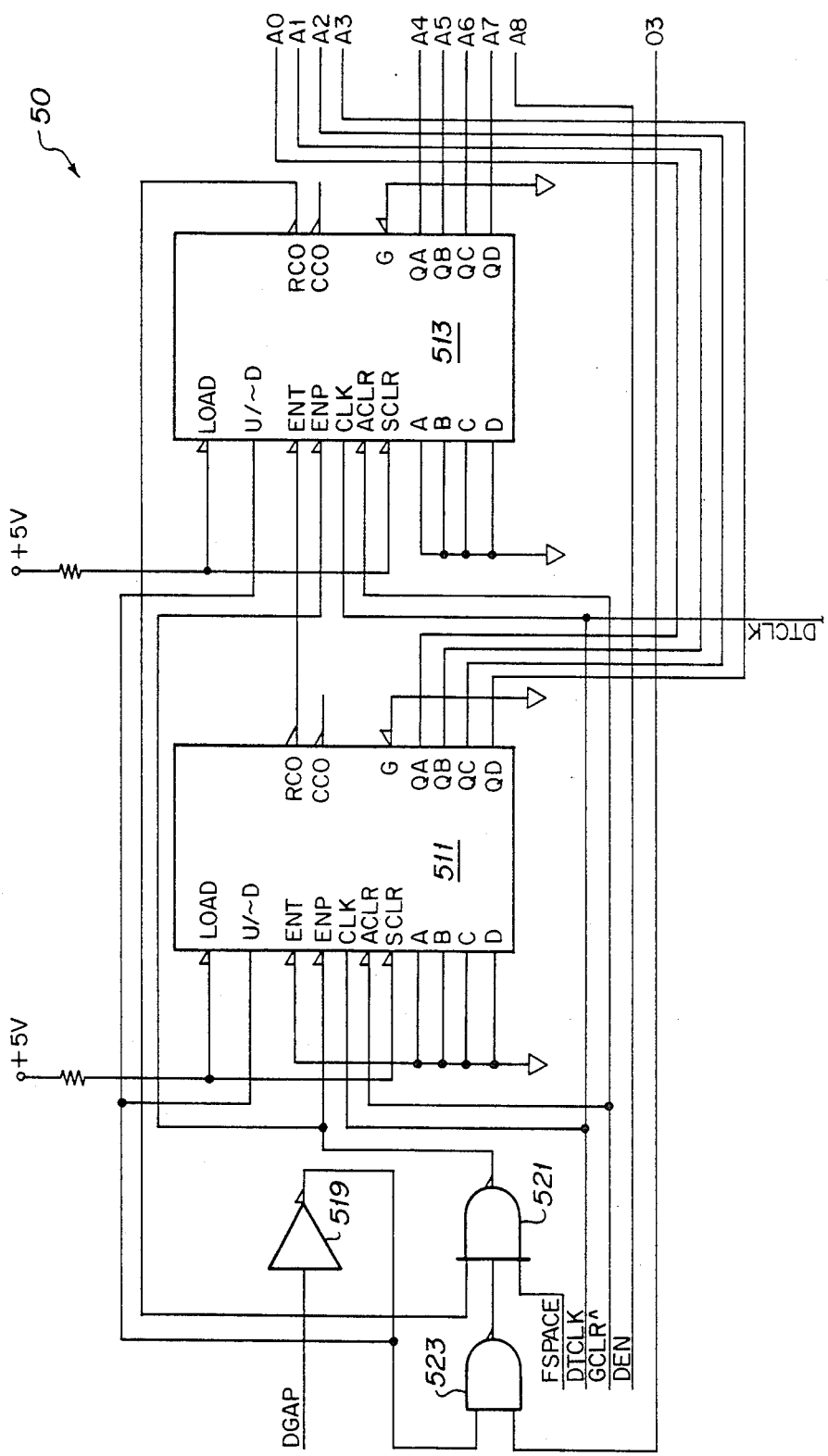
FIGS. 7A and 7B, is a logic circuit diagram for a block/gap filter incorporated in the block detect circuitry of FIG. 1.
Figure 7B:
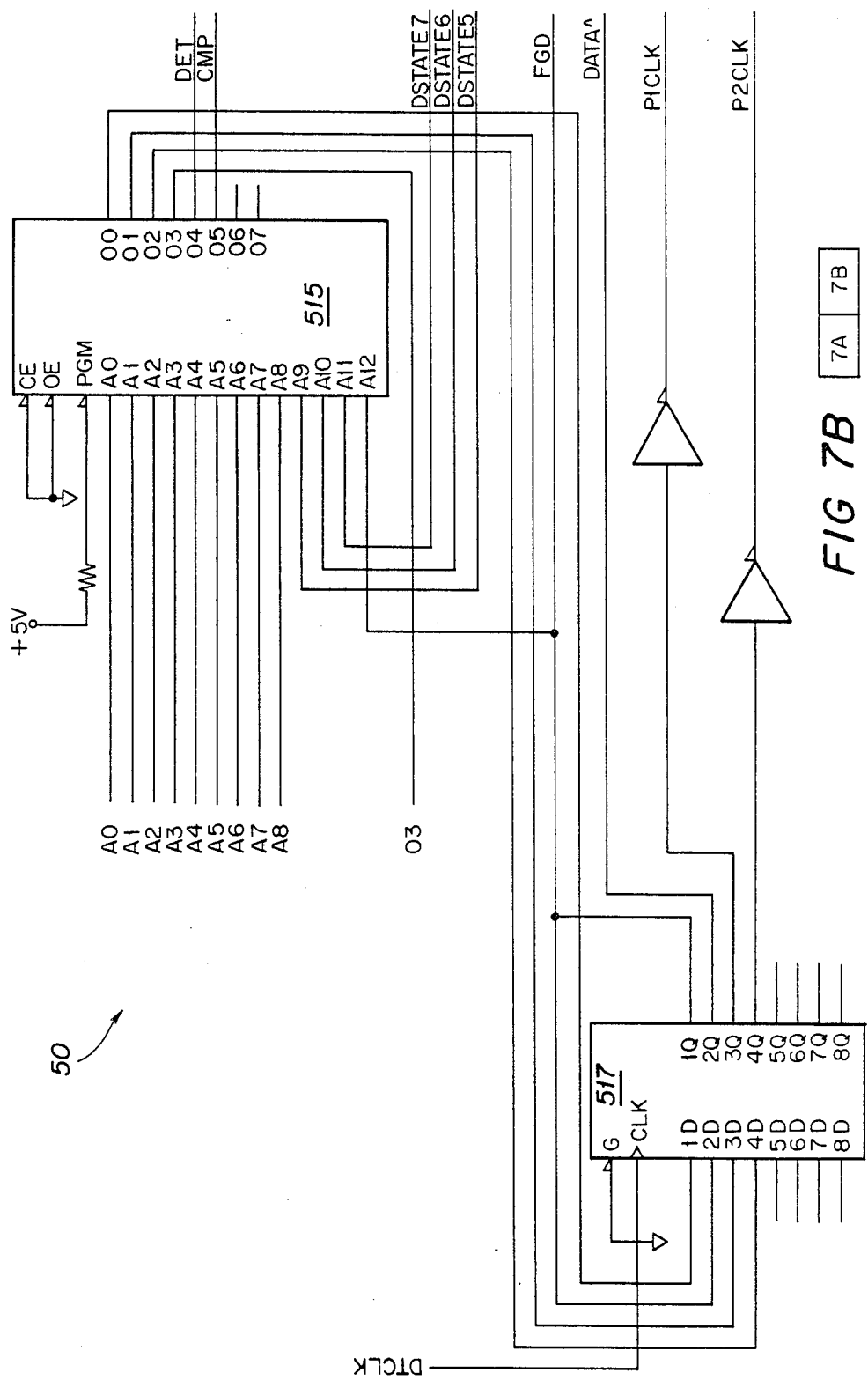

The blook/gap filter 50 comprises cascaded bi-directional counters 511 and 513, a look-up table ROM515 and an octal D-type flip-flop 517, as shown in FIG. 7. Inverter 519 serves to provide the proper sense to the DGAP signal so that the counters 511 and 513 count up when a block is detected and count down when a gap is detected.

FSPACE functions as an enable through the logic including NAND gate 521, whereas NAND gate 523 functions to disable upward counts when a programmed upper threshold is achieved. Both counters are clocked by DTCLK, as is the flip-flop 517. GCLR ⌃ drives the ACLR inputs of the counters 511 and 513, which are thus set to zero when GCLR ⌃ is active.

The Q outputs of counter 511 provide the four lower bits of addressing for ROM 515, while the Q outputs of counter 513 provide the next higher four bits of addressing. Considering the 13 bits of addresses A0–A12 on ROM 515 as constituting thirty-two pages of 256 addresses, page selection is effected by DEN, DSTATE[5:7] and a filtered gap detect signal FGD. FGD is output 00 of ROM 515 synchronized by the flip-flop 517. Thus, the FGD serves as a feedback signal to ROM 515 so that page selection is a function of the previous output of the ROM 515.

Thus, the lower 8 bits of addressing for ROM 515 are used to determine whether a threshold is attained. The lower threshold is zero, whereas the higher threshold is selected according to DEN at A8. Depending on the value fed back at A12, the output of the ROM 515 changes either only when the predetermined upper threshold is attained, or only when the counters count down to zero. The effect is that, once a block is detected, the counter must count down to zero for FGD to be changed to indicate a gap is detected; likewise, once a gap is detected, the counters must attain the upper threshold for a block to be indicated by FGD.

As in the case with the tape mark detector 40, this system handles noise quite effectively. Dropouts during a block cause only a temporary delay in the determination of a block, and likewise for a gap, noise causes only slight delays in determinations. In contrast, in the case of a conventional consecutive flux space approach, evenly distributed noise could prevent a gap from being detected at all.

FGD is fed back through the flip-flop 517 so provide a replica, DATA ⌃, delayed one DTCLK cycle. As indicated above, this DATA ⌃ signal is required by the read/formatter 146. Also provided are P1CLK and P2CLK which are inverted, at inverters 525, and synchronized, at flip-flop 517, versions of ROM 515 outputs 01 and 02, respectively.

Depending on the output of the state machine 20, output 01 of ROM 155 either matches output 00 of ROM 155 or is held low. Thus, when DSTATE[5:7]=011-111, output 01 is held low, so that P1CLK is held high; under the same conditions, DET is high. When DSTATE[5:7]=001-010, output 01 matches output 00 so that P1CLK is an inverted version of FGD; under these conditions DET is low.

When the state machine 20 is in pre-detect phase 1, P1CLK is active, and when the state machine 20 is in read phase 2 or gap check phase 3, P1CLK is inactive. Thus, the last transition of P1CLK occurs on the most recently detected gap-to-block boundary. Accordingly, P1CLK can be and is used to trigger a position capture identifying the location of the beginning of the current block.

Likewise, when DSTATE[5:7]=110-111, output 02 is held low so that P2CLK is held high; under the same conditions, CMP is high. When DSTATE[5:7]=0-01-101, output 02 is an inverted version of the output at 01 so that P2CLK replicates FGD; under these conditions, CMP is low.

When the state machine 20 is in pre-detect phase 1 or read phase 2, P2CLK is active, while during gap check phase 3, P2CLK is inactive. Accordingly, the last transition of the P2CLK before suppression marks a block-to-gap boundary. Thus, P2CLK serves as a trigger to capture a block end boundary. The P1CLK and P2CLK triggers are not subject to the delays involved in interrupting the drive controller 120, and so accordingly, the block/gap filter 50 provides for more precise delimitations of block positions. This in turn provides more greater accuracy during re-tries.

The 03 output of ROM 515 is fed back to NAND gate 523 to suppress upward counts while the upper threshold is maintained. Output DET from 04 is basically a block detect signal which is active while P1CLK is suppressed. Block complete signal CMP from output 05 is active while P2CLK is suppressed. CMP and DET are basically decodings of the detect state to be stored in a flag register of the command and status port 90 so the drive controller 120 can determine the phase of the state machine 20 at any time.

Figure 8A:
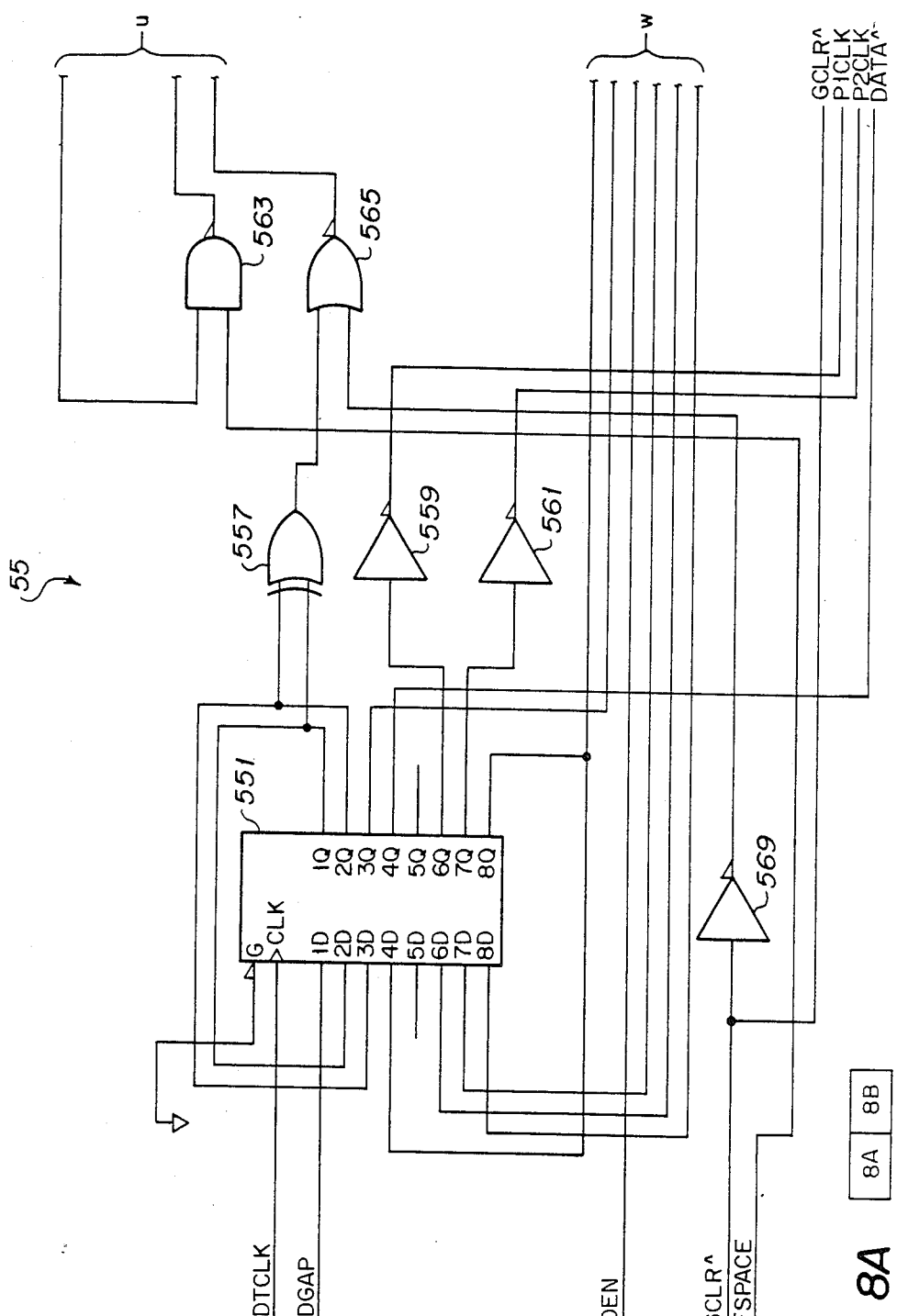
FIGS. 8A and 8B, is a logic circuit diagram for an alternative block/gap filter incorporable in the block detect circuitry of FIG. 1.
Figure 8B:
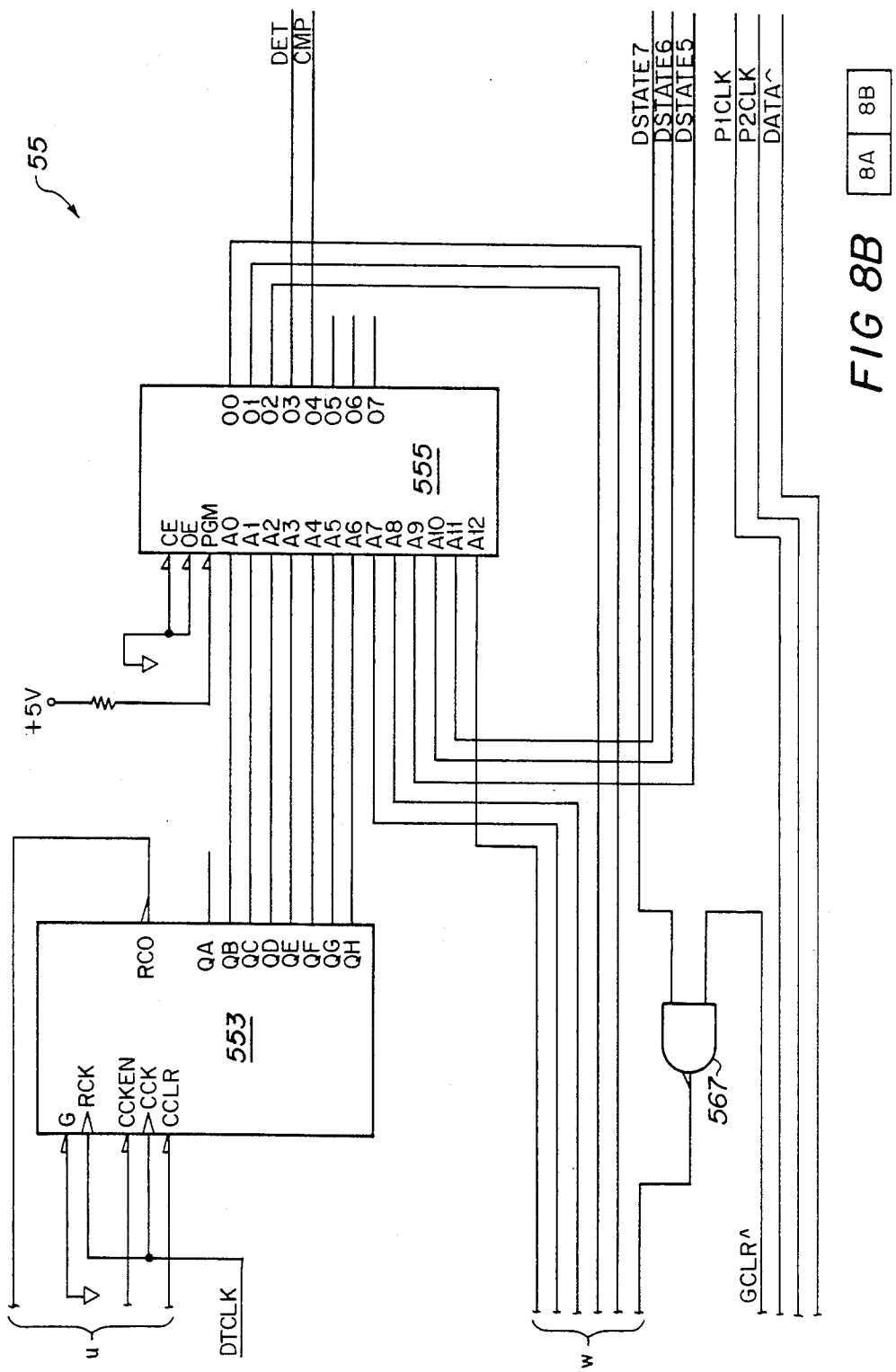

The block/gap filter can be implemented so as to count consecutive flux spaces using an uni-directional counter. For example, the alternative block/gap filter 55 of FIG. 8, comprises an octal D-type flip-flop 551, a counter 553 and a look-up table ROM 555. The flip-flop 551 serves to latch inputs and to produce delayed versions of appropriate signals. The counter 553 serves to evaluate block and gap detections over time to filter out the effects of small drop-outs and drop-ins.

The ROM 555 can be considered as comprising multiple look-up tables. The table is selected as a function of the output of the state machine 20 via lines DSTATE[5:7] at inputs A9–A11, the immediately prior output from 00, received at A12, the density format DEN at A8, and a delayed detected gap signal DGAP at A7. The address A0–A6 within the selected table is determined by the value in the counter.

The logic including exclusive-OR gate 557 is designed to reset the counter 553 whenever the detected signal switches between a gap and a block. This switching is effected by exclusive ORing the detected signal with its replica delayed one cycle, having been fed back across octal D-type flip-flop 551.

The block/gap filter 55 uses the detect clock DTCLK and flux space strobe FSPACE for timing. A gap filter clear signal GCLR ⌃ resets the counter to zero and clears feedback from the ROM at A12 as commanded by the drive controller 120 via port 90.

Output 00 basically tracks the thresholds as they are attained by the counter. After a delay is introduced by the flip-flop 551, this output yields the filtered gap signal FGD. An additional one DTCLK cycle delay introduced in a like manner yields the DATA ⌃ signal, which is output along with FGD from the block/gap filter 55.

The FGD signal is also fed back to the A12 input of the ROM 555 where it is used as a higher-order table-select addressing bit. This input is qualified by the DSTATE[5:7] inputs to generate the P1CLK and P2CLK which are generated at ROM outputs 01 and 02 and made synchronous by the flip-flop 551. Inverters 559 and 561 primarily serve as drivers, but also give the desired sense to P1CLK and P2CLK, respectively.

The block detect DET signal from ROM output 03 and the block complete signal CMP from ROM output 04 are also derived from the DSTATE[5:7] inputs. DET is active during phases 2 and 3, and CMP is active during phase 3 of state machine 20. Thus, P1CLK is active only when both DET and CMP are inactive, and P2CLK is active unless CMP is active.

NAND gate 563 serves to disable the counter 553 when FSPACE is inactive or when the ripple carry output RCO of counter 553 is active. NOR gate 565 serves to reset the counter 553 when GCLR ˆ is asserted or when DATA ˆ and FGD are unequal, indicating a new block or gap has just begun. NAND gate 567 permits the feedback loop to A12 of ROM 555 to be reset when GCLR ˆ is asserted. Inverter 569 gives the proper sense to GCLR ˆ as input to NOR gate 565.

By way of example, when entering a GCR block, DATA ˆ changes from 1 to 0 after 68 consecutive flux spacings of any track activity. This threshold was chosen because it is just larger than ⅛ of the minimum block size. When exiting a GCR block, DATA ˆ changes from 0 to 1 after 68 consecutive flux spacing of no track activity. This threshold was chosen because it is just larger than ⅛ of the minimum block size and also larger than the read formatter's pipeline for detecting gap before a data record end.

When entering a PE block, DATA ˆ changes from 1 to 0 after 22 consecutive flux spacings of any track activity. This threshold was chosen because it is just larger than ⅛ the minimum block size. When exiting a PE block, DATA ˆ changes from 0 to 1 after 44 consecutive flux spacing of no track activity. This threshold was chosen because it is just larger than ⅛ of the minimum block size and also larger than the read formatter's pipeline for detecting gap before a data record end.

In either format, the new determination of gap or block is reflected by FGD, and one DTCLK cycle later, by DATA ˆ. These two signals are provided to the block/gap meter 60.

BLOCK/GAP METER

The block/gap meter 60 measures the length of the block or gap currently being read from the tape 102. Generally, the block/gap meter 60 deals with lengths longer than those considered by the block/gap filter 50 and provides an encoded length to tell the state machine 20 when it has been in a block or gap for a particular length. This information is used primarily for time-out types of features.

The encoded lengths are output along block/gap length lines BGLEN[0:2]. These lines encode the following conditions used by the state machine 20: in block BLK, in block greater than maximum tape mark MTMB, in block greater than maximum postamble MPB, in gap GAP, in gap greater than maximum tape mark MTMG, in gap greater than 0.1 inch SGAP, and in gap greater than 0.25 inch BGAP. The function of these signals is indicated in the state diagram of FIG. 3.

Outputs to the command and status port 90 are DATA ˆ and BGAP. DATA ˆ is just passed through from the block/gap filter 50, whereas BGAP stands for big gap and becomes valid in a gap greater than 0.25 inches. This threshold is chosen because it is great enough for the drive controller 120 to position during retries. The drive controller 120 can poll the command and status port 90 for the status of the BGAP signal to determine whether there is a gap large enough for it to position around.

Figure 9A:
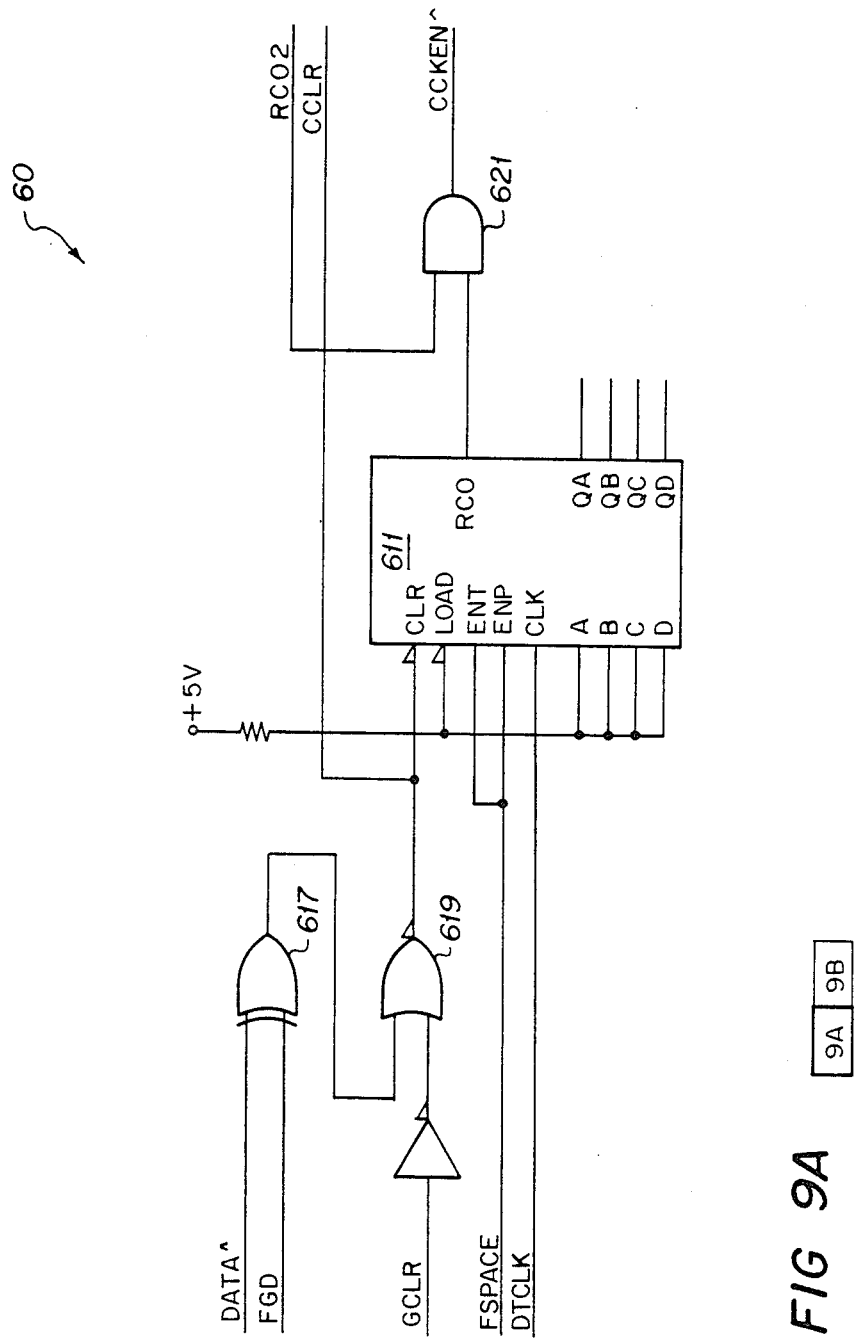
FIGS. 9A and 9B, is a logic circuit diagram for a block/gap meter incorporated in the block detect circuitry of FIG. 1.
Figure 9B:
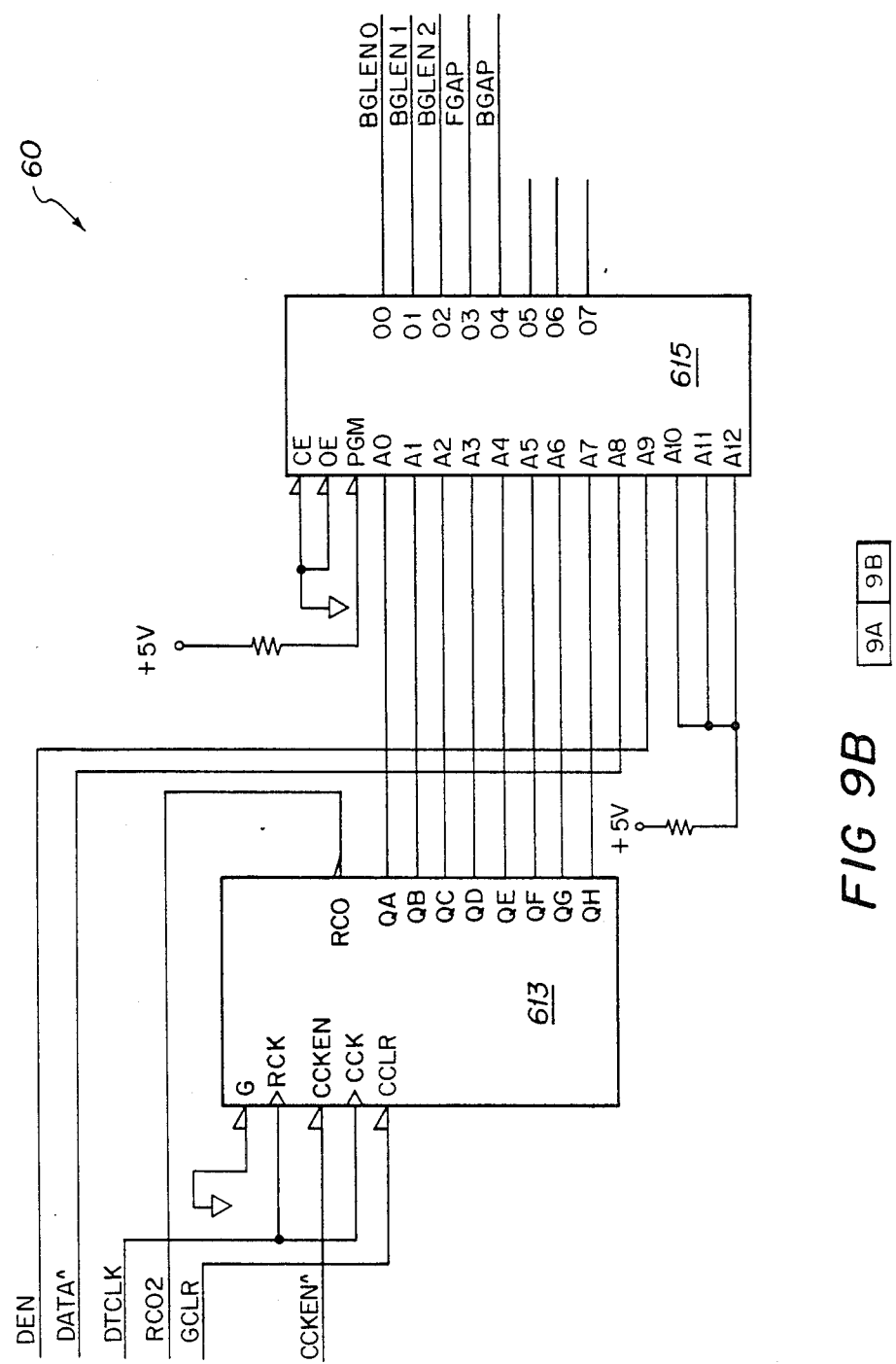
Figure 10A:
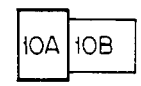
FIGS. 10A and 10B, is a logic circuit diagram for a verify counter incorporated in the block detect circuitry of FIG. 1.
Figure 10B:
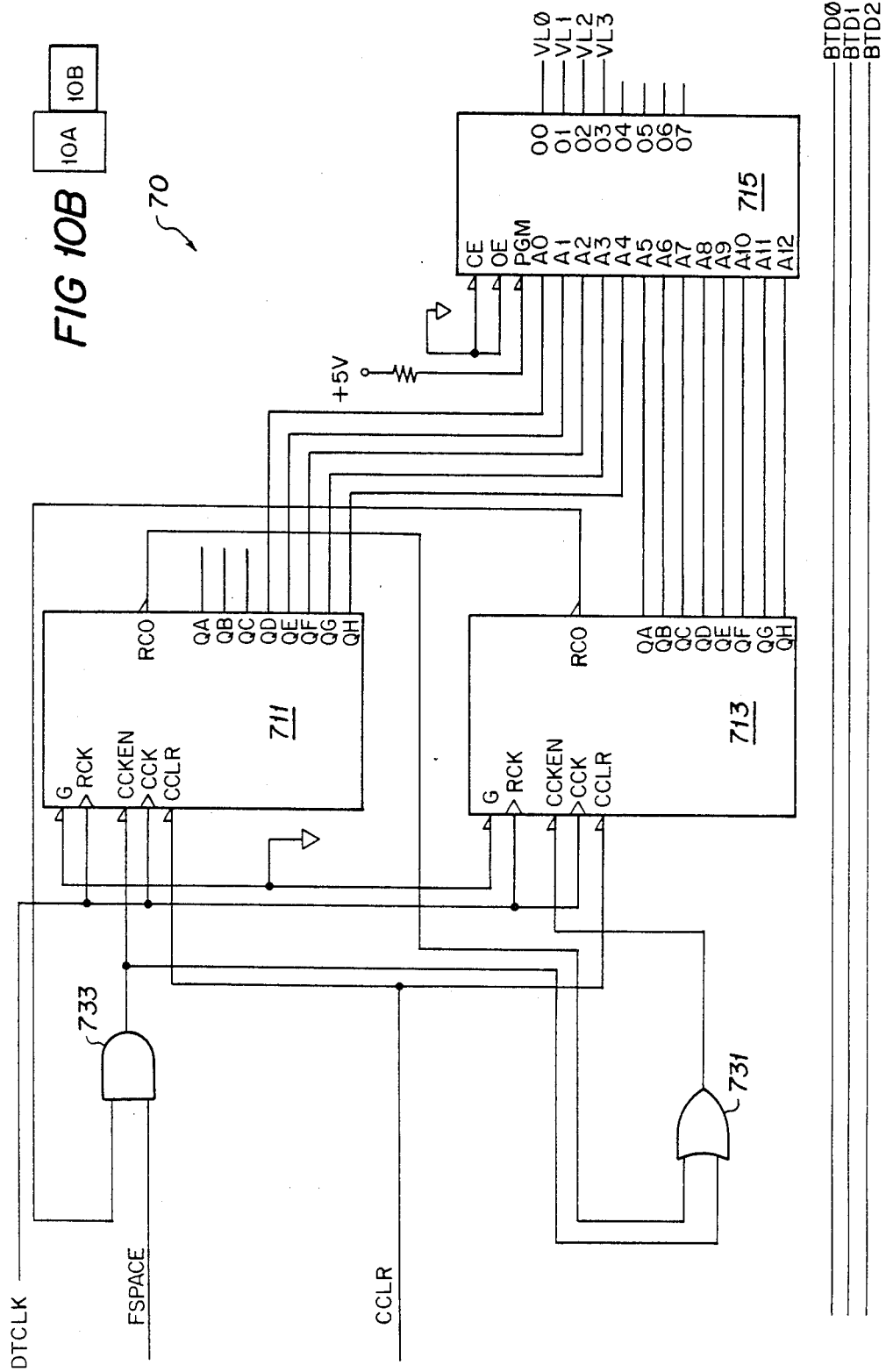
Figure 11:
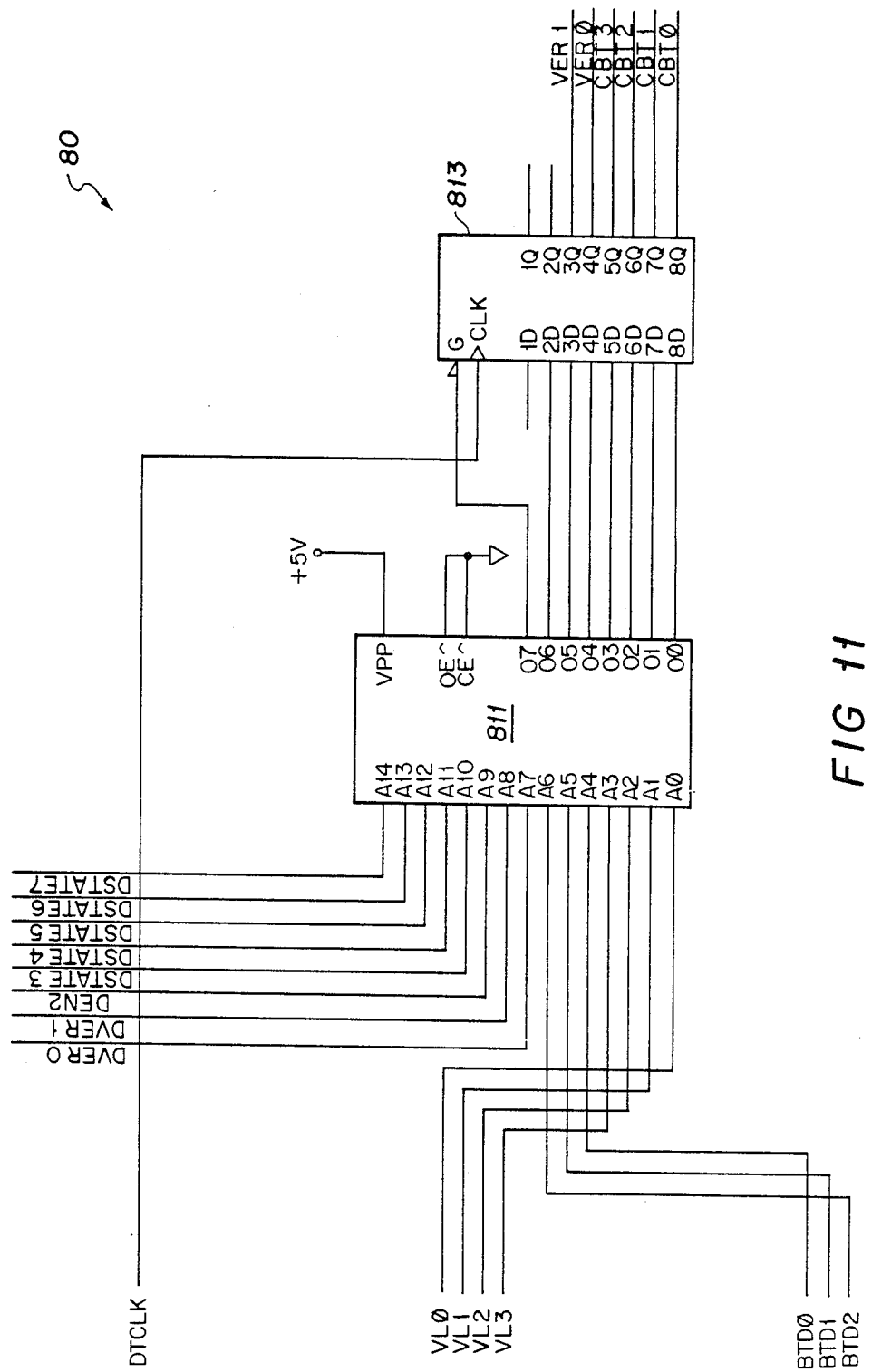
FIG. 11 is a logic circuit diagram for a block read/verify section incorporated in the block detect circuitry of FIG. 1.

As shown in FIG. 9, the block/gap meter 60 comprises cascaded counters 611 and 613 and a look-up table ROM 615. The FGD and DATA ˆ from gap filter 60 are operated upon by an exclusive OR gate 617 at the input of the block/gap meter section. Since DATA ˆ is simply the FGD signal delayed one DTCLK cycle, this arrangement serves to reset the counters 611 and 613 when a transition is made between a gap and a block determination. NOR gate 619 allows either the output of EXOR gate 617 or GCLR ˆ to reset the counter 611 and 613. DTCLK and FSPACE provide the strobes for the counters 611 and 613. AND gate 621 serves to disable counter 613 when its ripple carry output RCO indicates the counter's limit has been reached.

The inputs to the ROM 615 include 8-bits of count, DATA ˆ, and DEN. The format density DEN serves to select threshold levels appropriately. The DATA ˆ selects tables according to whether a gap or a block is present. The FGAP signal from 03 is essentially DATA ˆ and is latched by the command and status port 90. The "big gap" signal BGAP from 04 is sent to the command and status port 90 when the count represents that a minimum standard gap or block size has been met. The state machine 20 receives the three-bit bus BGLEN[0:2] encoding the presence of a gap or block and encoding length for use by the state machine 20.

VERIFY COUNTER

The verify counter 70 validates IDs and tape marks written on the tape. The verify counter receives the current block type BT[0:2] from the pattern decoder and counts consecutive flux spaces to determine the verify level VL[0:3] for the block read/verify circuit 80.

The verify counter 70 comprises cascaded counters 711 and 713 and a look-up table ROM 715. The inputs to this section include DTCLK, FSPACE, a verify count clear VCLR from the command and status port 90, and the three-bit block type BT[0:2] signal from the pattern decoder 30. Additional logic including a D-type flip-flop 717, exclusive OR gates 719, 721 and 723, OR gates 725 and 727, and NOR gate 729 logically combine the detect type signals with replicas delayed on DTCLK so that the counters are cleared whenever detect type DT[0:2] changes.

OR gate 731 ensures that the higher order counter 713 is enabled whenever the lower order counter 711 is enabled or outputting a carry from RCO. NAND gate 733 is used to inhibit counting when the higher order counter reaches its capacity.

The ROM 715 simply encodes 12 bits of counter output into four bits of verify levels VL[0:3]. These verify levels are joined by delayed block type signals BTD[0:2], which are twice delayed versions of the detect type signal BT[0:2] at outputs 5Q–7Q of flip-flop 717 as inputs to the block read/verify section 70.

BLOCK READ VERIFY

The block read/verify circuit 80 makes the final determinations as to block type and assigns verify levels to these determinations. The state machine 20 inputs are given priority in assigning block types, with DSTATE[5:7]=101, which only occurs after a synchronization valid signal SOK from the de-skew circuitry 144, indicating a data block. In this case, the DVER[0:1] input from the read/formatter 146 determines the verify level VER[0:1]. One function of the DSTATE[3:5] input is to distinguish between data records and ARA bursts, which are not distinguished in the BT signals.

In all cases other than a data record, the VL[0:3] input from the verify counter determines the final verification level. DSTATE[5:7]=100 is used to indicate a tape mark. All other block type determinations are based on the block type signal BTD[0:2] from the verify counter 70. The DSTATE, DVER, VL and BT inputs are collectively translated by a look-up table ROM 811 into four bits of complete block types CBT[0:3] along with two bits of verification VER[0:1]. The outputs are made synchronous to DTCLK at D-type flip-flop 813.

Generally, the highest of the four levels of verification is that required in verification mode, while the next highest is that required in read mode. The lower levels of verification generally require re-tries even in read mode.

COMMAND AND STATUS PORT

Figure 12:
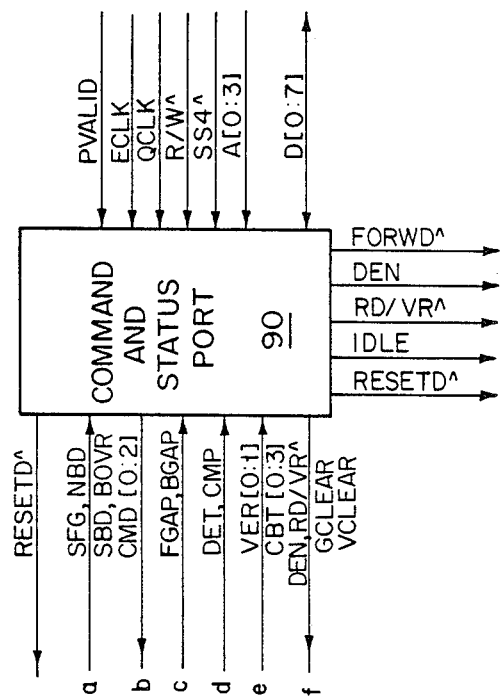
FIG. 12 is a block diagram of a command and status port used for interfacing with the block detect circuitry of FIG. 1.

The command and status port 90, shown in FIG. 12, is addressed by the drive controller 120 in a conventional manner. The SS4 ⌐ signal enables the port 90, while address lines A[0:3] select among the setup, command, status and flag registers of the port. Commands are written to these registers and status read from the registers along data bus D[0:7], as determined by the read/write line R/W ⌐ . A power valid line PVALID, and system clocks ECLK and QCLK are also received by the port 90.

Some of the setups are available to other components such as FORWD ⌐ , which permits reading during tape movement in reverse, and idle, which is directed to the de-skew circuitry 144. The remaining register addresses store bits the meanings for which have been detailed above.

In accordance with the foreoing, block detect circuitry providing for improved error handling in an incorporating tape drive system has been presented. As is apparent to those skilled in the art, the present invention provides for different selections and arrangements of sections, as well as many modifications to the sections as described. Furthermore, the present invention can be used in other signal processing applications where pattern recognition is required.

What is claimed is:

1. Block pattern detection circuitry comprising:
 a pattern detector for providing a pattern detection signal characterizing a received stream of parallel channels of data at the time of a data strobe, said pattern detector including means for receiving a stream of parallel channels of data and for receiving a data strobe, said pattern detection signal nominally discriminating between data pattern types including at least a first pattern type and a second pattern type;
 a thresholding means for providing qualified and unqualified pattern determination signals in response to thresholds attained as predetermined statistical functions over time of a received pattern detection signal, said thresholding means including input means for receiving pattern detection signals provided by said pattern detector, said thresholding means including means for receiving a qualifying input, said thresholding means being arranged so that said unqualified pattern determination signal undergoes a transition each time an attained threshold indicates a change in pattern has been determined, said thresholding means being arranged so that said qualified pattern determination undergoes a transition for thresholds attained except when an active qualifying input is received; and
 a state machine for providing a qualifying input to said thresholding means, said state machine being arranged to receive plural control input signals including a signal which is derived according to a predetermined function from said unqualified pattern determination signals from said thresholding means, said state machine being designed to progress through a network of states as a function of previous state and received control signals, said qualifying signal being a function of the state of said state machine so that the response of said qualified pattern determination signal to thresholds attained by said thresholding means can be qualified as a function of the state of said state machine.

2. The block pattern detection circuit of claim 1 wherein said state machine includes a first set of states nominally representing said first pattern type and a second set of states nominally representing said second pattern type, said state machine being designed to output an active qualifying input to said thresholding means when within a state of the second set.

3. The block pattern detection circuit of claim 1 wherein said thresholding means is designed to provide for a second qualified threshold determination signal, said state machine including first, second and third sets of states, said qualifying input to said thresholding means distinguishing among said first, second and third sets of states, said first and second qualified signals being responsive to threshold attainments while said state machine is in a state in said first set, said first and second qualified signals being non-responsive to threshold attainments while said state machine is in a state of said third set, said first qualified signal being non-responsive to and said second qualified signal being responsive to threshold attainments while said state machine is in a state of said second set.

4. The block pattern detection circuit of claim 1 wherein said thresholding means includes a pattern meter for outputting signals representing duration thresholds for a given pattern determination, said state machine being responsive to said durational signals in that some of the states of said state machine are attained as a function duration thresholds received from said pattern meter.

5. The block pattern detection circuit of claim 1 wherein said thresholder includes an bi-directional counter, said bi-directional counter counting up until a predetermined upper threshold is attained for each detection of said first pattern type, said counter counting down until a lower threshold is attained for each detection of said second pattern type, said unqualified pattern determination signal undergoing a transition each fist time one of said thresholds is reached following an attainment of the other of said thresholds.

6. The block pattern detection circuit of claim 1 wherein said first pattern type represents the presence of data, and said second pattern type represents the absence of data.

7. Block pattern detection circuitry comprising:
a pattern detector for providing a pattern detection signals characterizing a received stream of parallel channels of data at the time of a data strobe, said pattern detector including means for receiving a stream of parallel channels of data and for receiving a data strobe, said pattern detection signals nominally discriminating at least between blocks of data and gaps between blocks of data, and within blocks, at least between a first, second and other types of data blocks;
a mark thresholder for providing a second type determination signal verifying the presence of a block of said second type by outputting a second type signal when a threshold is attained as a function of pattern detection signals received from said pattern detector, said mark thresholder including means for receiving pattern detection signal from said pattern detector;
a block/gap filter for providing thresholded block-/gap signals as a function of pattern detection signals received from said pattern detector, said block/gap thresholder including means for receiving pattern detection signals from said pattern detector;
a block/gap meter for providing block/gap length signals encoding attained durational thresholds for said thresholded block/gap, said block/gap meter being designed to be reset each transition of the received thresholded block/gap signal, said block-/gap meter including means for receiving a thresholded block/gap signal from said block/gap thresholder;
a block pattern meter for providing a block-length signal encoding attained durational thresholds for a pattern detection signal received from said pattern detector;
a block type circuit for providing outputs reflecting block type determination and validity levels for such determinations, said block type determinations being a function of received pattern detection signals and received state signals, said verification signals being a function of said block type determinations and received durational thresholds, said block type circuit being arranged to receive pattern detection signals from one of said block pattern meter and said pattern detector, said block type circuit being arranged to receive durational thresholds from said block pattern meter, said block pattern meter having an input for receiving state signals; and
a state machine for outputting state signals, said state machine being arranged to receive plural control input signals including block/gap length signals from said block/gap meter, and second type determination signals from said mark type thresholder, said state machine being designed to progress through a network of states as a function of previous state and received control signals, said state signals being a function of the state of said state machine, said state machine including means for transmitting state signals to said block type circuit.

8. The block pattern detection circuitry of claim 7 wherein said block/gap thresholding means includes input means for receiving state signals output from said state machine, said state machine including a first set of states representing nominally gap-before block states, a second set of states representing nominally within-block states, and a third set of states representing gap-after-block states, said block/gap thresholding means further including means for outputting gap-to-block and block-to-gap positioning signals, said gap-to-block positioning signal changing values each change in pattern determination by said block/gap thresholding means provided said state machine is in a state in said first set of states, said block-to-gap positioning signal changing values each time pattern determination changes by said block-/gap thresholding means provided said state machine is in one of said first and second sets of states.

9. The block pattern detection circuitry of claim 7 wherein said mark thresholder includes a bi-directional counter so that when a predetermined upper threshold is attained, said mark thresholder signals that a second pattern type is detected and when a predetermined lower threshold is reached counting in the opposite direction said mark thresholder signals that no second pattern type is detected.

* * * * *